(12) United States Patent
von der Embse

(10) Patent No.: US 9,231,813 B1
(45) Date of Patent: Jan. 5, 2016

(54) COMMUNICATIONS FASTER THAN SHANNON RATE

(71) Applicant: Urbain Alfred von der Embse, Westchester, CA (US)

(72) Inventor: Urbain Alfred von der Embse, Westchester, CA (US)

(73) Assignee: Urbain A. von der Embse, Westchester, CA (US)

( * ) Notice: Subject to any disclaimer, the term of this patent is extended or adjusted under 35 U.S.C. 154(b) by 0 days.

(21) Appl. No.: 14/545,452

(22) Filed: May 7, 2015

(51) Int. Cl.
*H04L 5/12* (2006.01)
*H04L 23/02* (2006.01)
*H04L 27/34* (2006.01)
*H04L 27/38* (2006.01)
*H04L 1/00* (2006.01)
*H04L 5/00* (2006.01)

(52) U.S. Cl.
CPC .......... *H04L 27/3405* (2013.01); *H04L 1/0047* (2013.01); *H04L 1/0054* (2013.01); *H04L 5/0007* (2013.01); *H04L 27/38* (2013.01)

(58) Field of Classification Search
CPC ..... H04L 1/0047; H04L 1/0054; H04L 27/38; H04L 5/02; H04L 27/00
See application file for complete search history.

(56) References Cited

U.S. PATENT DOCUMENTS

| | | | |
|---|---|---|---|
| 6,426,723 B1 | 7/2002 | Smith | |
| 6,504,506 B1 | 1/2003 | Thomas | |
| 6,636,568 B2 | 10/2003 | Kadous | |
| 6,647,078 B1 | 11/2003 | Thomas | |
| 6,674,712 B1 | 1/2004 | Yang | |
| 6,728,517 B2 | 4/2004 | Sugar | |
| 6,731,618 B1 | 5/2004 | Chung | |
| 6,731,668 B2 | 5/2004 | Ketchum | |
| 6,798,737 B1 | 9/2004 | Dabak | |
| 6,856,652 B2 | 2/2005 | West | |
| 7,277,382 B1 | 10/2007 | von der Embse | |
| 7,337,383 B1 | 2/2008 | von der Embse | |
| 7,352,796 B1 | 4/2008 | von der Embse | |
| 7,376,688 B1 | 5/2008 | von der Embse | |
| 7,391,819 B1 | 6/2008 | von der Embse | |
| 7,394,792 B1 | 7/2008 | von der Embse | |
| 7,558,310 B1 | 7/2009 | von der Embse | |
| 7,680,211 B1 | 3/2010 | von der Embse | |
| 7,855,995 B1 | 12/2010 | von der Embse | |
| 7,907,512 B1 | 3/2011 | von der Embse | |
| 8,031,791 B2 | 10/2011 | von der Embse | |
| 8,121,020 B1 | 2/2012 | von der Embse | |
| 8,363,704 B1 | 1/2013 | Rayburn | |
| 8,630,362 B1 | 1/2014 | von der Embse | |
| 8,917,786 B1 * | 12/2014 | von der Embse | ............. 375/260 |

* cited by examiner

*Primary Examiner* — Daniel Washburn
*Assistant Examiner* — Amneet Singh

(57) ABSTRACT

This invention introduces a new architecture for quadrature layered modulation (QLM) communications which is faster $C/W=n_p b$ than the Shannon rate $C/W=b$ by using a data symbol rate $n_p W$ faster than the Nyquist rate W over a frequency band W where $n_p \geq 1$ is the data symbol rate increase and b is the data symbol information bits, by scaling the signal to compensate for the data symbol inter-symbol interference loss, by using a Shannon bound $E_b/N_o$ and SNR data symbol metrics, and by using QLM demodulation algorithms. This architecture provides the same performance as the other QLM architectures operating the communications as a layering of Shannon links over W. This new architecture enables existing communications links to exceed the Shannon rate by operating the transmitter at a faster data symbol rate over W, using the QLM metrics, and by implementing QLM demodulation in the receiver as described in this specification.

5 Claims, 27 Drawing Sheets

Shannon bound on the energy per bit $E_b$ and the signal-to-noise SNR of the communications data symbols required to support "b" bits per data symbol at the Shannon communications data rate $C/W=b$ is defined:

$$SNR \geq (2^{\wedge}b - 1)$$

$$E_b/N_o = SNR / (C/W)$$
$$\geq (2^{\wedge}b - 1)/b$$

FIG. 1

QLM bound on the energy per bit $E_b$ and the signal-to-noise SNR of the communications data symbols required to support "b" bits per data symbol at the QLM communications data rate $C/W = n_p b$ is defined:

$$SNR \geq \ell n_p^2 (2^{\wedge}b - 1)$$

$$E_b/N_o = SNR/(C/W)$$
$$\geq \ell n_p (2^{\wedge}b - 1)/b$$

FIG. 2

QLM communications capacity C/W can be defined as a function of SNR, $n_p$, £ which is maximized with respect to the selection of $n_p$ for a given SNR and recognizing that £ is dependent on $n_p$ for a given data symbol modulation and QLM demodulation algorithm. QLM C/W bound is:

$$C/W \leq \max_{n_p} [n_p \log_2(1+SNR/£n_p^2)]$$

FIG. 3

QLM communications capacity C/W can be defined as a function of $E_b/N_e$, $n_p$, £ which is maximized with respect to the selection of $n_p$ for a given SNR and recognizing that £ is dependent on $n_p$ for a given data symbol modulation and QLM demodulation algorithm. QLM C/W bound is:

$$C/W \leq \max_{np} [n_p \log_2(1+(E_b/N_e)(C/W)/£n_p^2)]$$

FIG. 4

QLM architecture:

1) increases the communications data symbol rate $W$ to the FTN rate $n_p W$ where $n_p \geq 1$ 2) increases the communications data rate $C/W = n_p b$ higher than the Shannon data rate $C/W = b$ 3) uses the Shannon data symbol metrics for $n_p = 1$ $SNR \geq (2^{\wedge}b - 1)$, $E_b/N_o \geq (2^{\wedge}b - 1)/b$ 4) uses the QLM data symbol scaled metrics for $n_p \geq 1$ $SNR \geq \ell n_p^2 (2^{\wedge}b - 1)$, $E_b/N_o \geq \ell n_p (2^{\wedge}b - 1)/b$, and 5) uses QLM demodulation algorithms.

FIG. 5

30  ML Matlab code for selecting "i" for the best ML trellis path "jx"

for jx = 1 : $n_s$^($2n_p$-2)
$\alpha_k(jx)$ = min{$\alpha_{k-1}(xi)+R_k(jxi)$}  wherein the "min"
   is over the "i" values
= new ML metric at step k for path "jx"
end ML state update $S_k(:,jx)=[\ \hat{x}_k(jxi); S_{k-1}(1:D-1,xi)]$    for $k \geq D$ 31  MAP Matlab code for selecting "j" for the best MAP trellis path "xi"

for xi = 1 : $n_s$^($2n_p$-2)
$\alpha_k(xi)$ = min{$\alpha_{k-1}(jx)+R_k(jxi)$}  wherein the "min"
   is over the "j" values
= new MAP metric at step k for path "xi"
end MAP state update:  $S_k(:,xi)=[\ \hat{x}_k(jxi); S_{k-1}(1:D-1,jx)]$    for $k \geq D$

FIG. 12

FIG. 16, 17 Parameters

| | Reference | Symbol | Bits/Symbol | np Layers | C/W Bps/Hz |
|---|---|---|---|---|---|
| MAP Trellis | 1 | 8PSK | 2 | 2 | 4 |
| | 2 | 16QAM | 3 | 2 | 6 |
| | 3 | 16QAM | 3 | 3 | 9 |
| | 4 | 64QAM | 4 | 3 | 12 |
| | 5 | 64QAM | 4 | 4.5 | 18 |
| | | 64QAM | 4 | 6 | 24 |
| | | 256QAM | 6 | 4 | 24 |
| ML ns=4 | 1 | 8PSK | 2 | 4 | 6.5 |
| | 2 | 16QAM | 3 | 4 | 9.75 |
| | 3 | 64QAM | 4 | 4 | 13 |
| | | 256QAM | 6 | 4 | 19.5 |
| ML ns=4 | 1 | 8PSK | 2 | 6 | 9.5 |
| | 2 | 16QAM | 3 | 6 | 14.25 |
| | 3 | 64QAM | 4 | 6 | 19 |
| | | 256QAM | 6 | 6 | 28.5 |

FIG. 18

COMMUNICATIONS FASTER THAN SHANNON RATE

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

This patent application is a continuation-in-part (CIP) of patent application Ser. No. 14/544,748.

BACKGROUND OF THE INVENTION

I. Field of the Invention

The present invention relates to cellular communications and also relates to the Nyquist rate for data symbol transmission, the Shannon bound on communications capacity, and symbol modulation and demodulation for high-data-rate satellite, airborne, wired, wireless, and optical communications and includes all of the communications symbol modulations and the future modulations for single links and multiple access links which include electrical and optical, wired, mobile, point-to-point, point-to-multipoint, multipoint-to-multipoint, cellular, multiple-input multiple-output MIMO, terrestrial networks, and satellite communication networks. In particular it relates to WiFi, WiFi 802.11ac, WiMax, long-term evolution LTE, 3G, 4G, 5G for cellular communications and satellite communications. WiFi, WiMax use orthogonal frequency division multiplexing OFDM on both links and LTE uses single carrier OFDM (SC-OFDM) on the uplink from user to base station and OFDM on the downlink form base station to user. WiMax occupies a larger frequency band than WiFi and both use OFDM waveforms. SC-OFDM LTE is a single carrier orthogonal waveform version of OFDM which uses orthogonal frequency subbands of varying widths.

II. Description of the Related Art

Bounds on current communications capacity are the communications Nyquist rate, the Shannon rate, and the Shannon capacity theorem. The Nyquist complex sample rate is $1/T=B$ where B is the signal bandwidth, the Shannon data symbol rate $W \geq B$ in Hz is the frequency band $W=(1+\alpha)B$ where $\alpha$ is the excess bandwidth required to capture the spillover of the signal spectrum beyond B with a representative value being $\alpha=0.25$, and the Shannon capacity theorem specifies the maximum data rate C in Bps (bits/second) which can be supported by the communications link signal-to-noise power ratio SNR=S/N over W.

The Nyquist rate $1/T$ is the complex digital sampling rate $1/T=B$ that is sufficient to include all of the information within a frequency band B over a communications link. Faster than Nyquist rate communications (FTN) transmits data symbols at rates $1/T_s \geq 1/T$ wherein $1/T_s$ is the data symbol transmission rate in the frequency band B which means $T_s$ is the spacing between the data symbols. FTN applications assume the communications links with a data symbol rate equal to the Nyquist rate $1/T_s=1/T=B$ operate as orthogonal signaling with no intersymbol interference (ISI) between the demodulated data symbols. It is common knowledge that the communications data symbol rate $1/T_s$ for orthogonal signaling can be increased to as high as 25% above the Nyquist complex sample rate $1/T_s=1/T=B$ with very little loss in $E_b/N_o$ and with no perceptible loss in some cases using simple data symbol modulations. Above 25% it has been observed that there is a rapid loss in signal strength. Only a few studies have addressed data symbol rates above 25%. An example in U.S. Pat. No. 8,364,704 transmits digital bit streams at FTN rates and depends on the transmit signal alphabets to be in distinct locations on receive to enable alphabet detection. There is no comparison or proof that the data rate performance is comparable to the performance using conventional orthogonal signaling.

The Shannon bound on the maximum data rate C is complemented by the Shannon coding theorem, and are defined in equations (1).

Shannon bound and coding theorem

1 Shannon capacity theorem $$C \leq W \log_2(1 - SNR)$$

2 Shannon coding theorem for the information bit rate
$R_b$

For $R_b < C$ there exists codes which support reliable communications

For $R_b > C$ there *are no* codes which support reliable communications (1)

Wherein the equality "=" is the Shannon bound, C in Bps is the channel capacity for an additive white Gaussian noise AWGN channel in W, "$\log_2$" is the logarithm to the base 2, and C is the maximum rate at which information can be reliably transmitted over a noisy channel where SNR=S/N is the signal-to-noise ratio in the frequency band W.

MIMO communications enable higher capacities to be supported with multiple independent links over the same bandwidth. This multiple-input multiple-output MIMO requires the physical existence of un-correlated multiple communications paths between a transmitter and a receiver. MIMO uses these multiple paths for independent transmissions when the transmission matrix specifying these paths has a rank and determinant sufficiently large to support the paths being used. In MIMO U.S. Pat. No. 7,680,211 a method is disclosed for constructing architectures for multiple input transmit and multiple output receive MIMO systems with generalized orthogonal space-time codes ($C_O$) which are generalization of space-time codes C and generalizations ($H_O$) of the transmission matrix (H) that enable the MIMO equation $Y=Hf(C,X)+No$ to be written $Y=H_O C_O X+N_o$ which factors out the input signal symbol vector X and allows a direct maximum-likelihood ML calculation of the estimate $\hat{X}$ of X, and wherein Y is the received (Rx) symbol vector, $N_o$ is the Rx noise vector, and $f(C,X)$ is a non-separable encoding C of X.

OFDM waveform implement the inverse FFT (IFFT=$FFT^{-1}$) to generate OFDM (or equivalently OFDMA which is orthogonal frequency division multiple access to emphasize the multiple access applications). OFDM uses pulse waveforms in time and relies on the OFDM tone modulation to provide orthogonality. SC-OFDM is a pulse-shaped OFDM that uses shaped waveforms in time to roll-off the spectrum of the waveform between adjacent channels to provide orthogonality, allows the user to occupy subbands of differing widths, and uses a different tone spacing, data packet length, and sub-frame length compared to OFDM for WiFi, WiMax. In addition to these applications the symbol modulations 4PSK, 8PSK, 16QAM, 64QAM, 256QAM are used for satellite, terrestrial, optical, and nearly all communication links and with maximum data symbol rates achieved using 256QAM.

Current architectures for quadrature layered communications (QLM) enable communications faster than the Shannon rate by overlaying additional communications links over the same frequency band. The communications capacity of the QLM link is the combined capacity of the overlayed links and can exceed the Shannon bound for a single link in equation (1). QLM increases the energy per bit and the signal-to-noise (SNR) for each data symbol in order to compensate for the signal energy loss due to the inter-symbol (ISI) interference of the data symbols in these overlapped links. Representative QLM demodulation algorithms are described in this specification.

SUMMARY OF THE INVENTION

This invention introduces a new architecture for quadrature layered modulation (QLM) which can communicate at a faster rate than the Shannon bound in (1) by enabling the communications data symbols to be transmitted at a rate $1/T_s$ which is faster than the Nyquist rate (FTN) $1/T=B$ and equal to $1/T_s=n_p/T$ where the parameter $n_p \geq 1$ is the QLM increase in the data symbol rate above the Nyquist baseband communications data symbol rate for the link being considered. At the Shannon bound $\alpha=0$ and $B=W$, the Nyquist rate $1/T=W$ is equal to the Shannon data symbol rate $1/T_s=W$, the channel capacity is equal to $C=b/T$ where "b" is the number of information bits per data symbol, and the FTN rate parameter $n_p \geq 1$ measures the QLM data symbol rate compared to the Shannon rate.

This new architecture uses the Shannon bound metrics on the energy per bit and SNR of the data symbols, and scales the corresponding metrics for QLM to compensate for the ISI loss in the data symbols due to the data symbol overlap for $n_p>1$. These scaled metrics enable QLM to operate at FTN rates while maintaining essentially the same bit-error-rate (BER) performance. Representative demodulation algorithms for this new architecture are disclosed in this specification. These algorithms apply to this architecture and the other architectures for QLM communications links in order to provide faster communications than the Shannon bound. Two groups of applications discussed in this specification respectively use the time and frequency differentiating parameters for enabling separation of the overlapped data symbols. Time differentiation transmits data symbols in time at the QLM rate $n_p/T_s$ in a continuous or data packet architecture. Frequency differentiation transmits data symbols in frequency at the QLM frequency separation $1/n_pT_s$ in each $FFT^{-1}$ data packet. Both time and frequency data symbols are transmitted for QLM at the FTN rate $n_pW$ when the FTN rate W is the Shannon bound data symbol rate $1/T_s=W$. This specification also applies to combinations of time and frequency differentiating parameters as well as other differentiating parameters including beam forming, optical wavelength, and MIMO.

QLM recognizes that the Shannon bound is a bound on the information capacity supported by the performance metrics $E_b/N_o$ and SNR=S/N and proves the scaled Shannon bound on data capacity applies to each of the data symbols. The $E_b$ is the data pulse energy per information bit b, $N_o$ is the noise power density, S is the signal power, $N=N_o/T_s$ is the noise power, and SNR is the signal-to-noise power ratio and equivalently is the signal energy to noise energy ratio of the data pulse. Inverting the Shannon bound and using the $E_b/N_o$ and SNR=S/N definitions enables one to use the Shannon bound to specify the performance metrics C/W, $E_b/N_o$, SNR for the data symbols as functions of the information bits b supported by these data symbols. This enables these bounds to be used for QLM operating in the FTN range by increasing (scaling) the energy per bit and SNR of the data symbols to compensate for the ISI. Scaling requires the $E_b/N_o$ and SNR for the baseband ($n_p=1$) communications link to be scaled to the values $\pounds n_p E_b/N_o$ and $\pounds n_p^2 SNR$ for QLM. For $n_p=2$ and $\pounds=1$ the $n_p$ is the exact scaling value. For larger values $n_p>2$ the $n_p$ is a lower bound on the scaling parameter and requires the additional loss factor or scaling factor $\pounds \geq 1$ which is a function of $n_p$, data symbol modulation, and the demodulation algorithm. $E_b$ is the energy per bit and $E_b/N_o=SNR/b$ is the SNR per bit which also is referenced as the energy per bit with the understanding that it refers to $E_b/N_o$ since the $N_o$ is the noise power density independent of $\pounds n_p$ and $E_b$.

The QLM properties and performance prove that QLM can support data rates at least double the rates supported by the Shannon bound. A complementary math proof-of-concept is disclosed in FIG. 19 which proves QLM supports a data rate which is twice the Shannon rate.

A derivation of the bound on the QLM communications capacity is presented which uses a geometric derivation of the Shannon bound modified to apply to QLM. Results are the same as previously derived in QLM U.S. Pat. No. 7,391,819 with the geometric derivation providing a new insight into the QLM bound.

Two sets of QLM demodulation algorithms disclosed are the maximum likelihood (ML) data packet and the trellis algorithms. Trellis algorithms are the ML and the co-state maximum a-posteriori (MAP) algorithms. ML algorithms have their roots in the current set of ML convolutional decoding and turbo-decoding algorithms. The MAP algorithms were introduced to provide the correct mathematical technology for these applications and with a decoding and trellis demodulation performance which is at least as-good-as the ML algorithms, These algorithms provide demodulation architectures and implementations of QLM for OFDM, SC-OFDM LTE, MIMO to support at least doubling of the data rates and with applicability to all communications. Performance estimates are the normalized data rate (communications efficiency) C/W vs. $E_b/N_o$ and SNR=S/N for the QLM and Shannon bounds, and for the reference 4PSK, 8PSK, 16QAM, 64QAM, 256QAM, 4096QAM data symbol modulations. PSK is phase shift keying data symbol modulation and QAM is quadrature amplitude data symbol modulation. Measured bit-error-rate (BER) simulation data is disclosed for trellis demodulation of 4PSK with $n_p=1$-6 and for ML data packet demodulation of 4PSK and 256QAM for FTN rates $n_p=1$-8.

Representative QLM OFDM and QLM SC-OFDM architectures are disclosed for implementation of QLM transmitters and receivers using frequency offset as the differentiating parameter for QLM OFDM and using time offset as the differentiating parameter for QLM SC-OFDM, and implementing the QLM demodulation with ML trellis or MAP trellis algorithms. Frequency packing for QLM OFDM transmits the QLM data symbols at frequency offset intervals $1/n_pT_s$ compared to the $1/T_s$ orthogonal intervals of the $FFT^{-1}$ waveforms over the ideal frequency-time space $W-T_s$ of each OFDM data packet. The actual $W-T_s$ space is slightly different due to the need for a frequency spillover interval and a timing interval for waveform sidelobes and packet information. Unless otherwise stated the ideal $W-T_s$ space will be assumed in this specification in reference to OFDM. The FTN rate for OFDM is the data symbol rate equal to W since there are at most $W/T_s$ data symbol orthogonal $FFT^{-1}$ waveforms or tones in each OFDM data packet and the data packets are transmitted at the $1/T_s$ rate. The corresponding QLM data symbol rate is $n_pW$ which is $n_p$ times the FTN rate identical to the performance using time offsets as the differentiating parameter over W previously addressed. For SC-OFDM for LTE the QLM as FTN SC-OFDM waveforms are offset in time at a FTN rate $n_p/T_s$ compared to the original SC-OFDM waveform rate $1/T_s$.

A representative MIMO cellular communications link architecture using QLM with MAP trellis demodulation is disclosed in this invention for the transmit and receive signal processing algorithms and supporting block diagrams are developed to illustrate the architecture and implementation,

BRIEF DESCRIPTION OF THE DRAWINGS AND THE PERFORMANCE DATA

The above-mentioned and other features, objects, design algorithms, and performance advantages of the present invention will become more apparent from the detailed description set forth below when taken in conjunction with the drawings wherein like reference characters and numerals denote like elements, and in which:

FIG. 1 defines the Shannon bounds on the data symbol $E_b/N_o$, SNR.

FIG. 2 defines the QLM bounds on the data symbol $E_b/N_o$, SNR.

FIG. 3 defines the QLM bound on C/W as a function of the data symbol SNR.

FIG. 4 defines the QLM bound on C/W as a function of the data symbol $E_b/N_o$.

FIG. 5 lists the QLM properties.

FIG. 6 calculates the time pulse correlation, candidate waveform ψ time response, and the ψ correlation in time.

FIG. 7 calculates the frequency pulse correlation, DFT waveform frequency response, and the DFT correlation in frequency.

FIG. 8 describes the QLM ML $n_s=2, 3, 4$ data symbol packets. in the baseband layer and illustrates the overlaying of the $n_p-1$ QLM layers on these baseband layers.

FIG. 9 presents the ML data packet measured BER performance vs. the QLM scaled $(E_b/N_o)/n_p$ for a pulse waveform with 4PSK modulation for QLM with $n_p=1, 2, 4, 6, 8$ layers for the $n_s=2, 3, 4$ data symbol packets.

FIG. 10 presents the ML data packet measured BER performance vs. the QLM scaled $(E_b/N_o)/n_p$ for a pulse waveform with 256QAM modulation for QLM with $n_p=1, 8$ layers for the $n_s=3, 4$ data symbol packets, and for a Grey coded 256QAM performance bound.

FIG. 11 describes how the ML and MAP trellis algorithms select the best path jxi from trellis state $S_{k-1}$ to trellis state $S_k$.

FIG. 12 presents the Matlab code for calculating the best path from trellis state $S_{k-1}$ to trellis state $S_k$ and using this selection to update $S_k$ for each of the possible mainlobe states.

Figure 15:
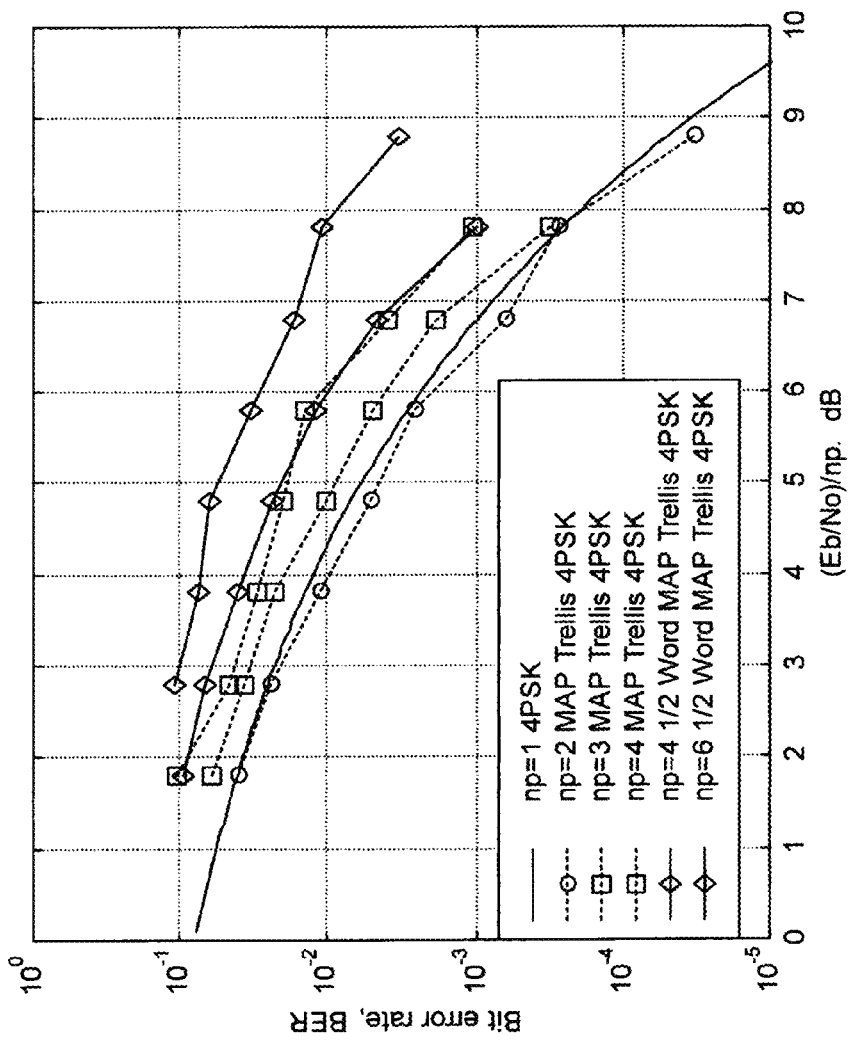

FIG. 15 presents the MAP trellis measured BER performance vs. the QLM scaled $(E_b/N_o)/n_p$ for a pulse waveform with 4PSK modulation for QLM layers $n_p=1, 2, 3, 4$ and for $n_p=4, 6$ using a 2-word MAP trellis demodulation.

Figure 16:
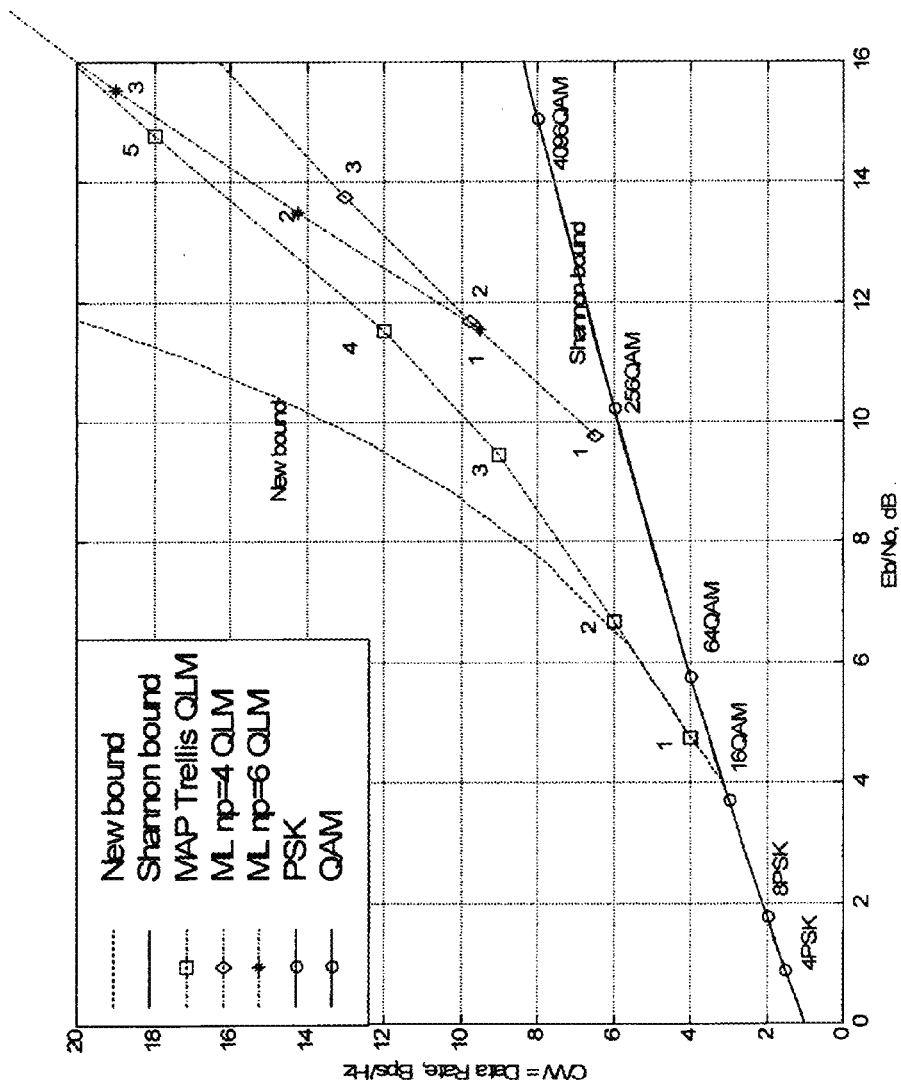

FIG. 16 calculates the communications data rate C/W versus $E_b/N_o$ for the new bound on QLM, Shannon bound, for PSK and QAM, using the demodulation parameters in FIG. 18.

Figure 17:
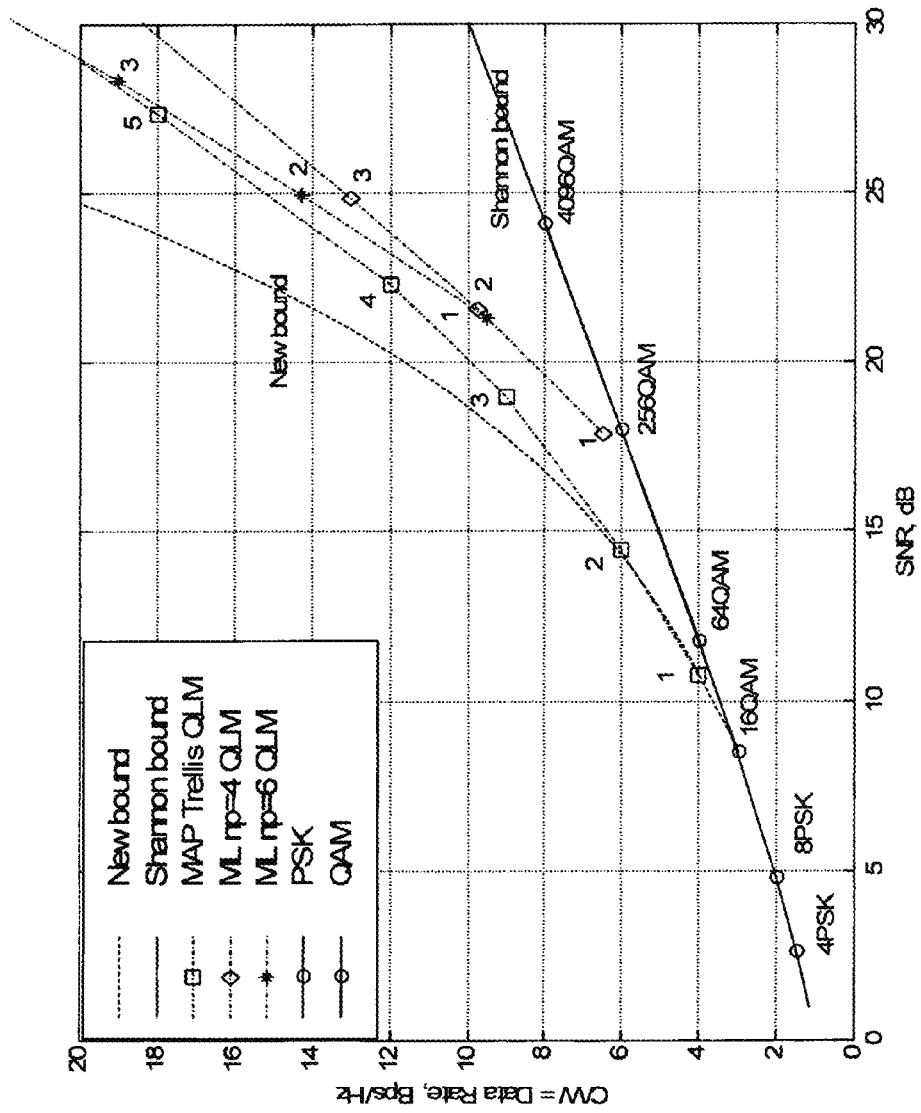

FIG. 17 calculates C/W versus SNR for the new bound on QLM, Shannon bound, for PSK and QAM, using the demodulation parameters in FIG. 18.

FIG. 18 lists the MAP trellis and ML demodulation parameters used to calculate the performance expressed as C/W vs. the $E_b/N_o$ in FIG. 16 and S/N in FIG. 17

Figure 19:
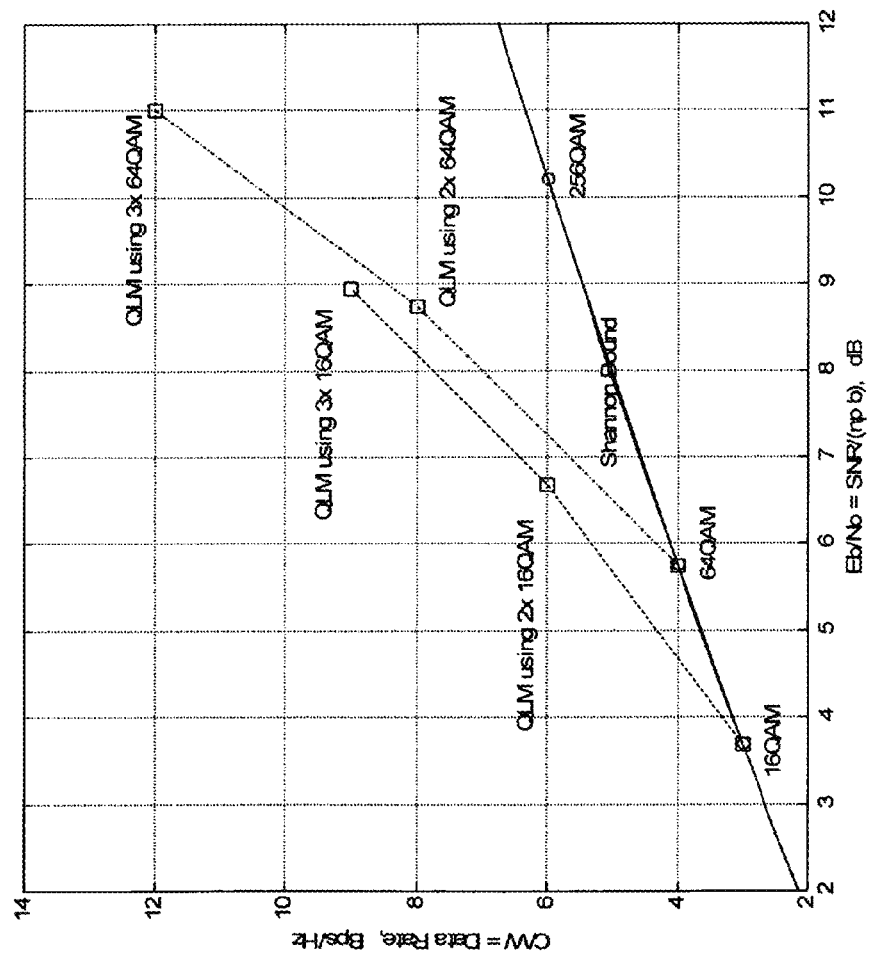

FIG. 19 presents the performance data base for C/W vs. $E_b/N_o$ which demonstrates that the QLM data rate is 2× the Shannon rate for the highest cellular data modulation 256QAM.

Figure 20:
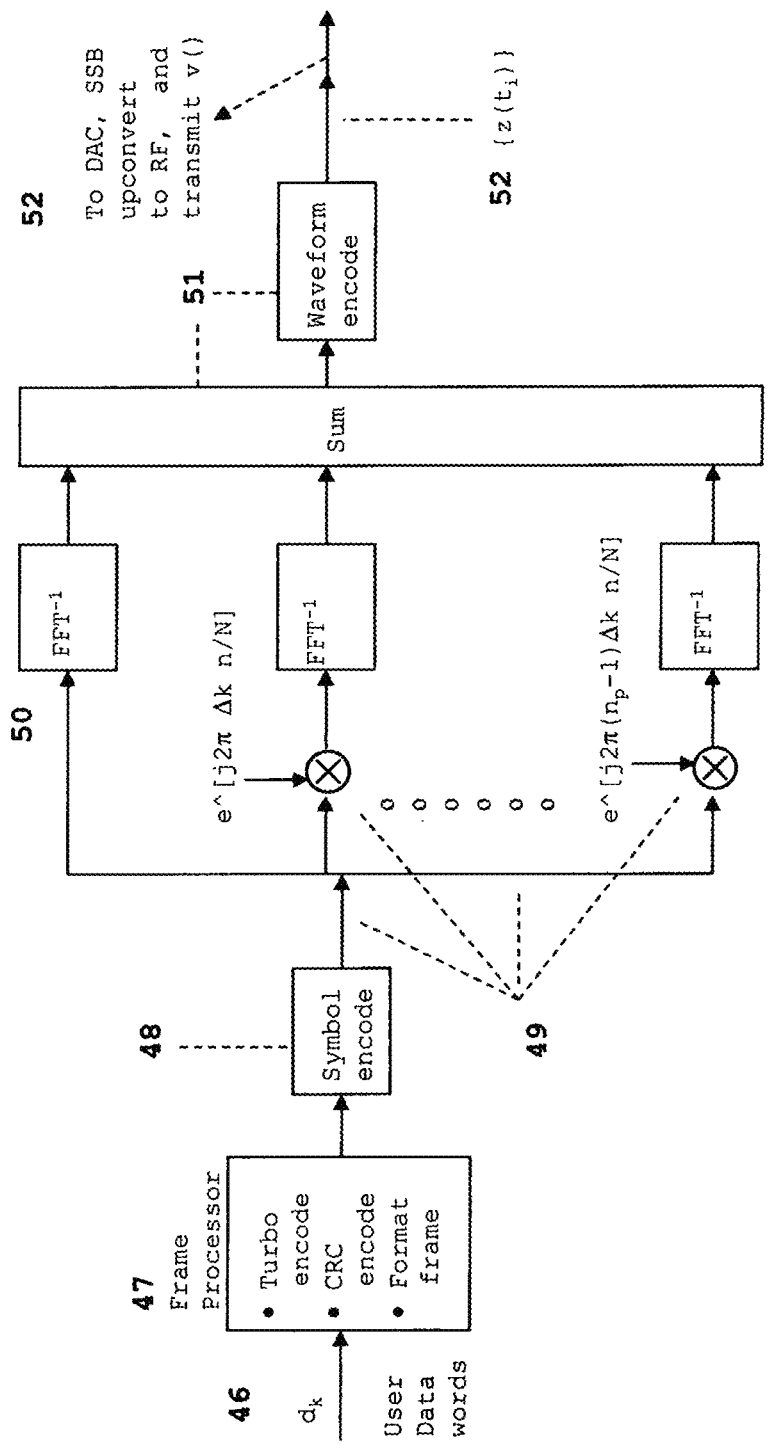

FIG. 20 is a representative transmitter implementation block diagram for QLM OFDM.

Figure 21:
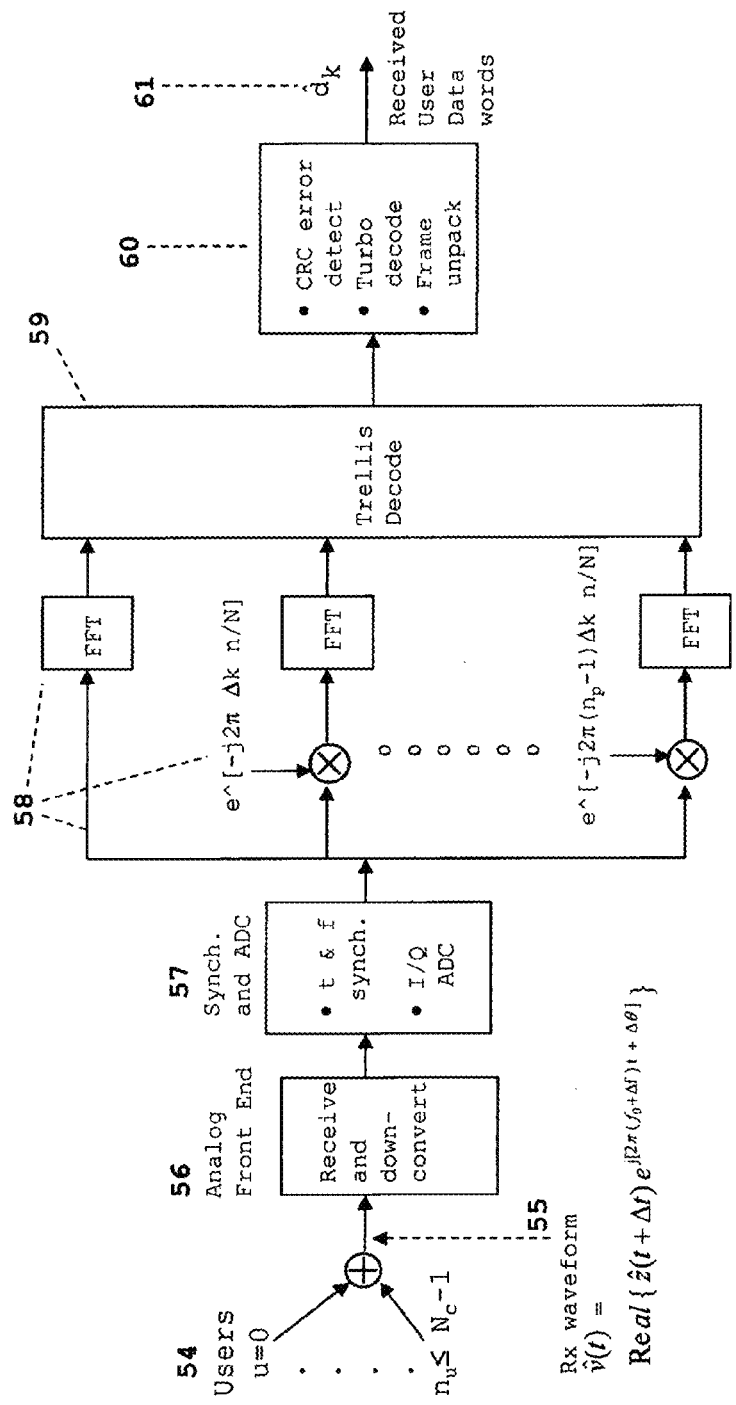

FIG. 21 is a representative receiver implementation block diagram for QLM OFDM.

Figure 22:
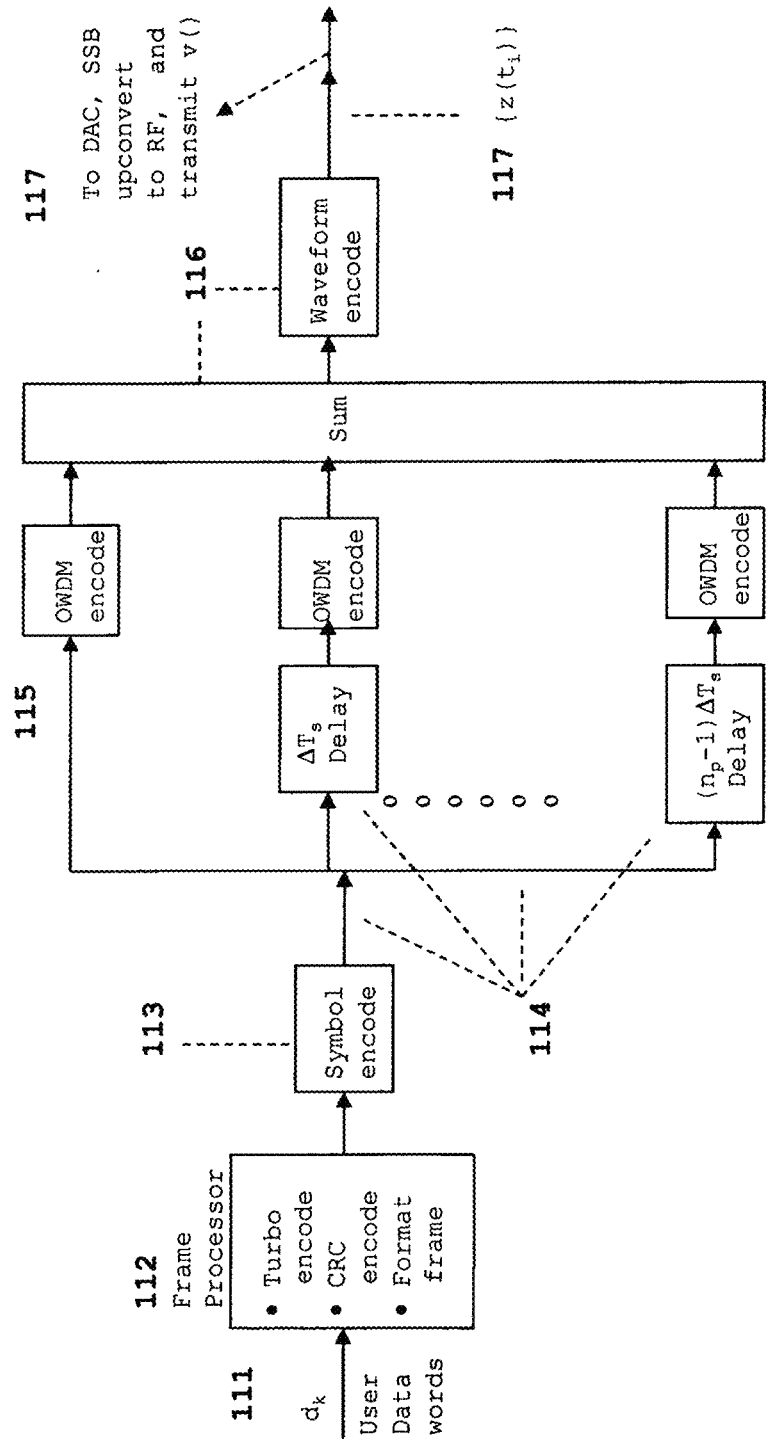

FIG. 22 is a representative transmitter implementation block diagram for QLM LTE.

Figure 23:
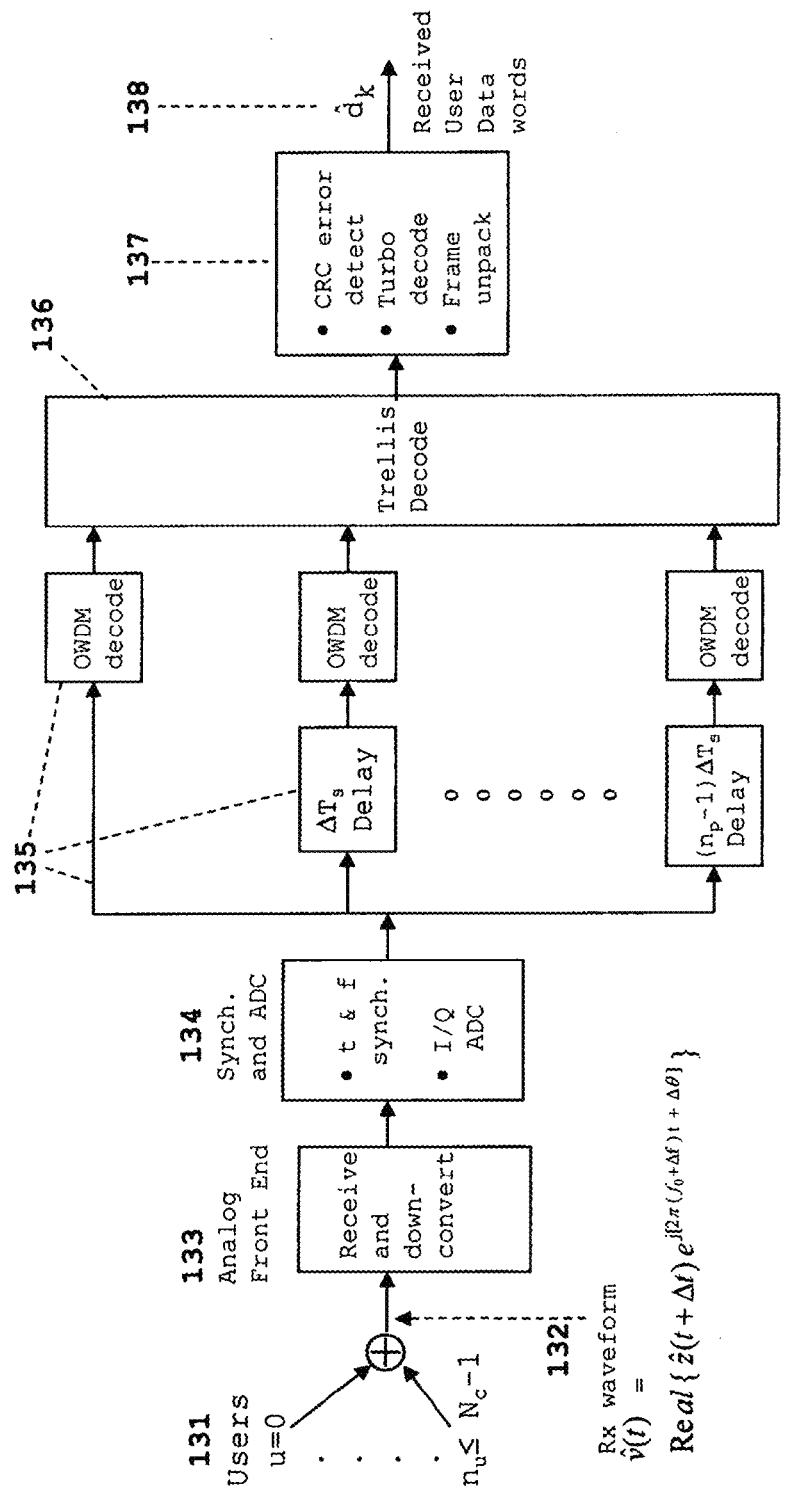

FIG. 23 is a representative receiver implementation block diagram for QLM LTE.

Figure 24:
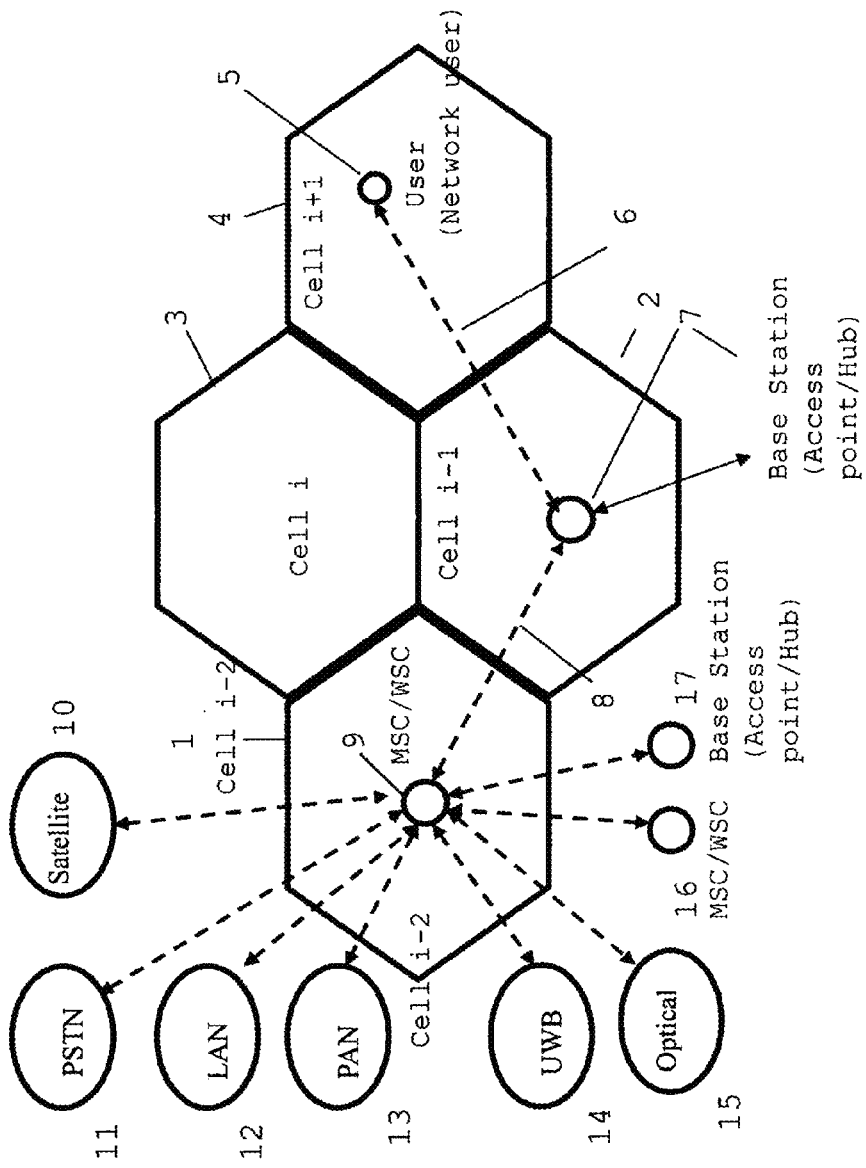

FIG. 24 is a schematic cellular network with the communications link between a base station and one of the users.

Figure 25:
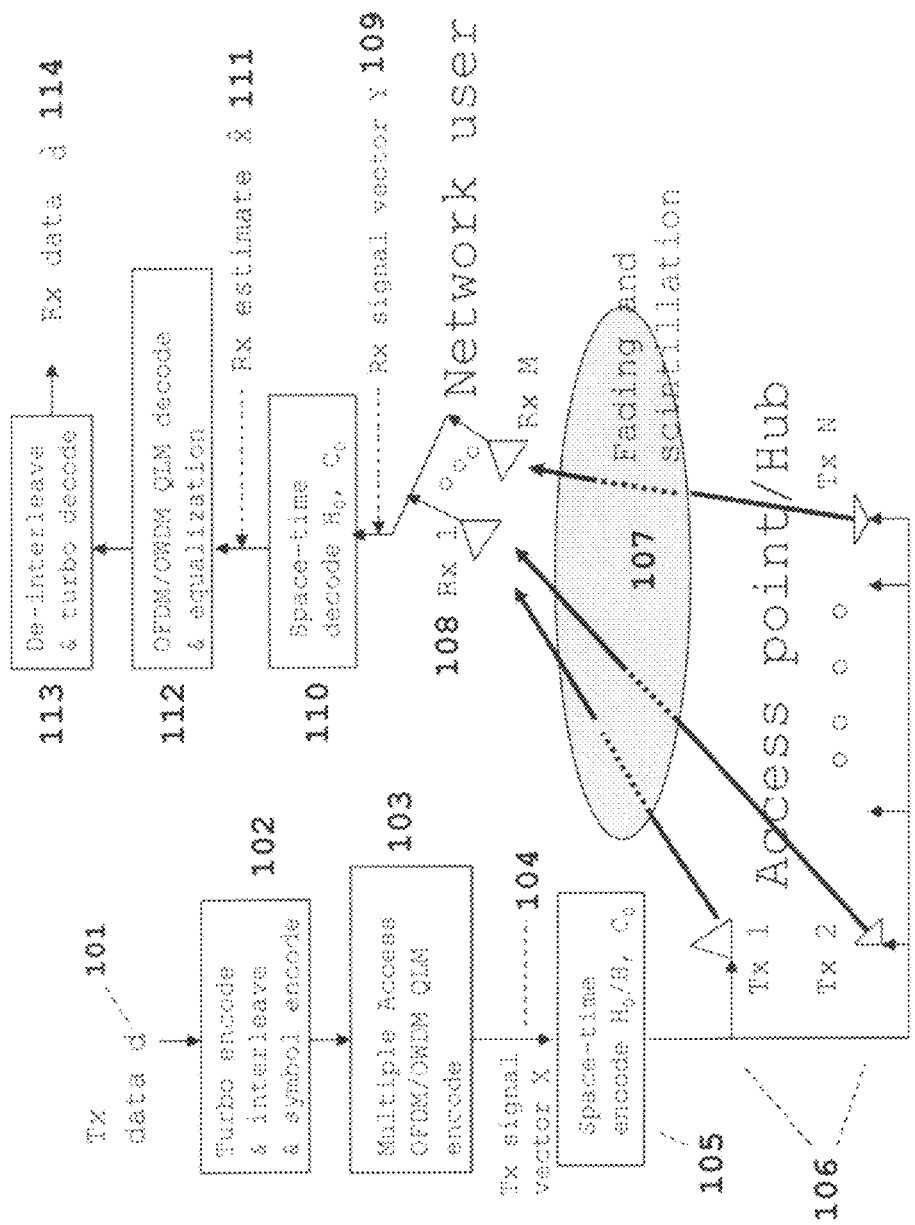

FIG. 25 is a representative architecture of this invention disclosure for MIMO systems for application to the communications link in FIG. 24.

DETAILED DESCRIPTION OF THE INVENTION

OFDM, SC-OFDM, LTE applications of quadrature layered modulation QLM in this invention disclosure are illustrated by WiFi and WiMax which uses OFDM on both uplinks and downlinks between the user and base station for cellular communications as well as for communications with satellites, and by LTE which uses OFDM on the downlink and SC-OFDM on the uplink. QLM OFDM adds the OFDM orthogonal data symbol tones at frequency offsets and QLM SC-OFDM adds data symbol tones in separate channels.

FIG. 1 Shannon bound on the link metrics at the Nyquist rate $n_p=1$ is derived by first observing that the Shannon bound in (1) is a bound on the communications performance metrics C/W, $E_b/N_o$ for $n_p=1$ and $1/T_s=1/T=B=W$, wherein C/W in Bps/Hz=b/s/Hz is the communications efficiency equal to the capacity per unit of the frequency band W and "s" is second. The Shannon bound for C/W=b can be inverted to derive the metric bounds $$SNR \geq (2^b-1)$$

$$E_b/N_o = SNR/b$$

$$\geq (2^b-1)/b \qquad (2)$$

which are equivalent to the Shannon bound wherein the equality "=" is the Shannon bound. To prove this we start with the definition $1/T_s=1/T=B$ for $n_p=1$ which proves $C/W=(b/T_s)/(1/T_s)=b$. Inverting the expression for C in (1) and using C/W=b yields $SNR \geq (2^b-1)$. This enables the definition $E_b/N_o=SNR/b$ to yield $E_b/N_o \geq (2^b-1)/b$ completing the proof.

Figure 6:
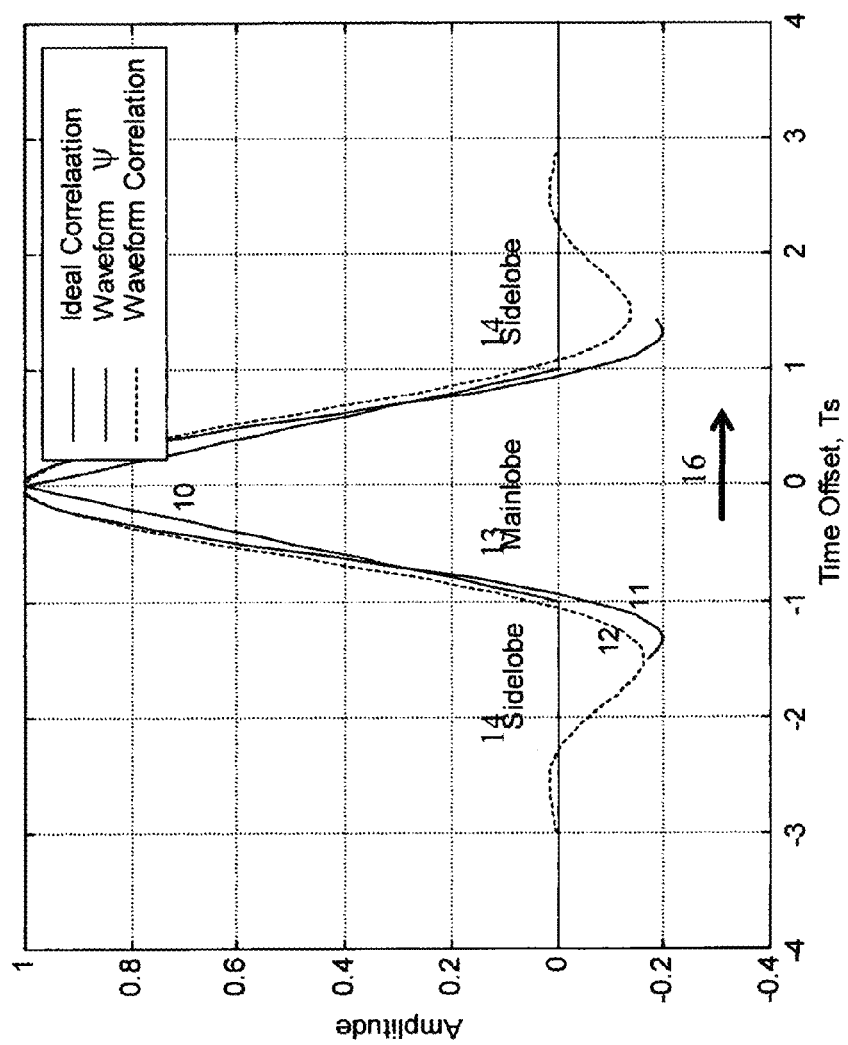
Figure 7:
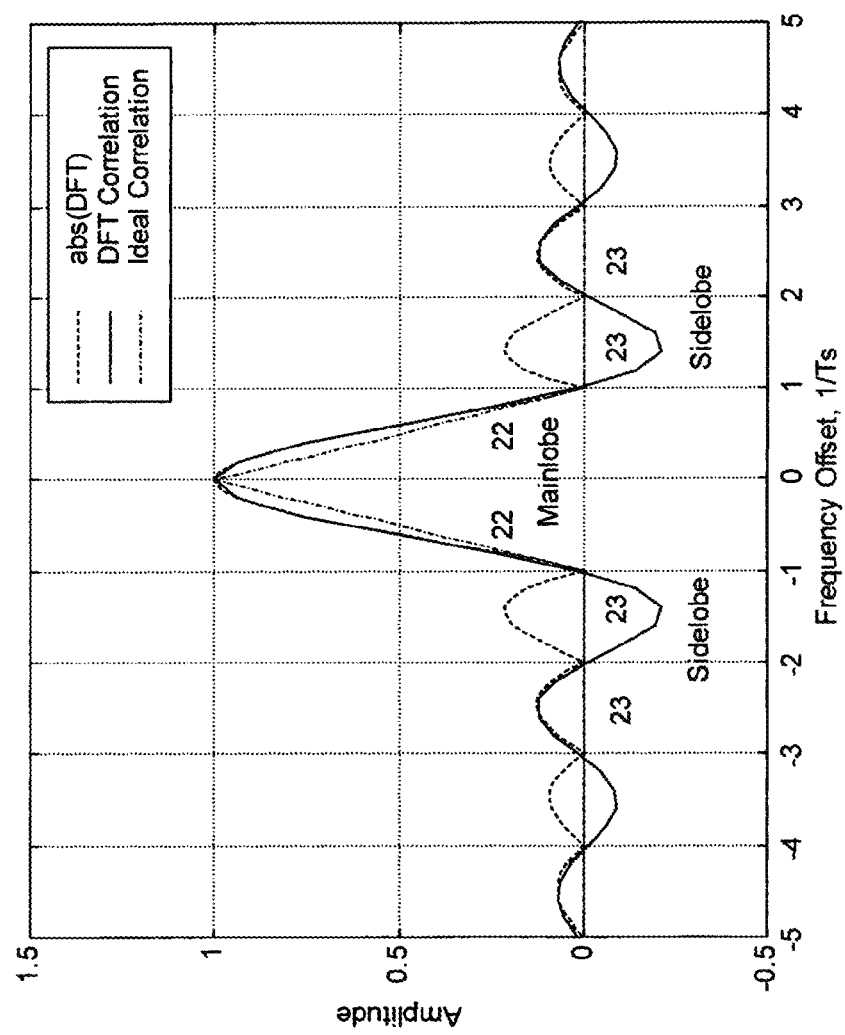

FIG. 2 bound on the QLM link metrics is derived from (2) as follows. The QLM received (Rx) demodulation signal processing synchronizes and removes the Rx waveform by performing a convolution of the Rx waveform encoded data symbol with the complex conjugate of this waveform, to detect the correlated data symbols. This convolution is a correlation of the waveform with itself as illustrated in FIG. 6 and FIG. 7 since the waveforms are real and symmetric. Consider a QLM communications link receiver detecting the Tx signal s(t)

$$s(t) = \sum_k x_k \psi_k(t - kT_s/n_p) \quad (3)$$

where $x_k \psi_k$ are the data symbol pulses, the $x_k$ are the encoded data symbols, and the pulse waveforms $\psi_k$ are orthogonal at the Nyquist rate $1/T_s = 1/T = B$, are real and symmetric, are normalized with the square norm equal to unity, and have correlation functions behaving like the triangular correlation function in FIG. 6,7. The Rx signal $z(t) = s(t) + v(t)$ is detected to recover the estimates $y_k$ of the Tx data symbols $x_k$ by implementing the correlation of the Rx signal with the pulse waveform at the Rx data symbol rate. We find $$\begin{aligned} y_k &= \langle \psi_k, z(t) \rangle \\ &= \langle \psi_k, s(t) + v(t) \rangle \\ &= \sum_n \langle \psi_k(t - kT_s/n_p), x_n \psi_n(t - nT_s/n_p) + v(t) \rangle \\ &= x_k + \sum_i c(|i|)(x_{k+i} + x_{k-i}) + N_k \end{aligned} \quad (4)$$

wherein $\langle \psi_k, z(t) \rangle$ is the inner product of the waveform $\psi_k$ with the Rx signal $z(t)$ after synchronization and translation to baseband, the inner product of $\psi_k$ with $z(t)$ is the correlation of the complex conjugate of $\psi_k$ with $z(t)$ evaluated at the reference time $t=0$ for $y_k$, correlation coefficients $c(|i|)$ of the waveforms are symmetric $c(+i) = c(-i)$ and equal to the inner product of the waveforms $c(i) = \langle \psi_k(t-kT_s/n_p), \psi_{k+i}(t-(k+i)(t-(k+i)T_s/n_p) \rangle$, and the $v(t)$, $N_k$ are the additive white Gaussian noise (AWGN). At the peak the normalized correlation is unity $c(0)=1$. The first correlation is $c(1)=1-1/n_p$, the second is $c(2)=1-2/n_p$, ..., and $c(n_p)=0$. The Euclidian distance between the peak correlation value at $c(0)=1$ and the first correlated signal is equal to $1-c(1)=1/n_p$ and between the second is $1-c(2)=2/n_p$, and so forth. The energy of the first correlated signal is equal to $c(1)^2(|x_{k+1}|^2 + |x_{k-1}|^2)$ and behaves as unwanted interference with equal statistical components along and orthogonal to the axis of the detected signal energy $E = |x_k|^2 = A^2 \forall k$. This means that the squared Euclidian distance between the detected signal $x_k$ energy level and the first correlated signal energy level along this detection axis is equal to $A^2/n_p^2$ for a mainlobe triangular correlation. This requires the signal energy to be increased to $n_p^2 A^2$ to make this shortened distance $n_p^2(A^2/n_p^2) = A^2$ equal to the same value $A^2$ measured in the absence of any correlation interference for $n_p=1$ and therefore the same error rate performance for $n_p=2$ causing the first correlated interference. This scaling provides the exact QLM performance C/W for $n_p=2$ and upper bounds the C/W for $n_p>2$ since the Euclidean distance is lower than predicted for $n_p>2$. An additional loss parameter £≥1 is required to provide the correct scaling for $n_p>2$ in the $E_b/N_o$, SNR metrics. BER measurements for the ML demodulation in FIG. 9, 10 and for the trellis demodulation in FIG. 15 measure this additional loss £ which must be included in the $n_p$ scaling of the $E_b/N_o$, SNR for QLM. This proves the Shannon bounds in (2) for $n_p=1$ are scaled to become the QLM bounds for $n_p>1$ in (5) to support the data rate $C/W = n_p b$.

$$SNR \geq £n_p^2(2^b - 1)$$

$$E_b/N_o = SNR/(C/W)$$

$$\geq £n_p^2(2^b - 1)/b \quad (5)$$

Figure 9:
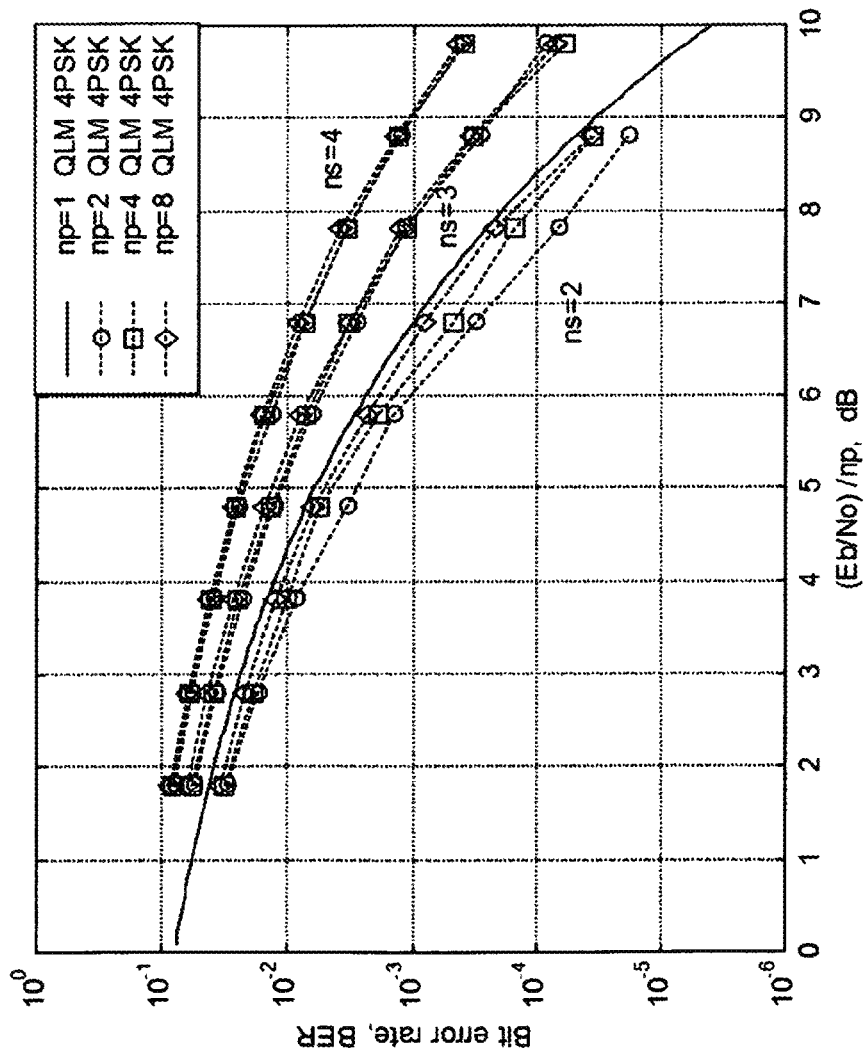

FIG. 3 QLM bound on C/W as a function of SNR, $n_p$, £ is derived starting with the Shannon bound in (1) expressed as a bound on $C/W \leq \log_2(1 + SNR)$. For QLM the SNR is scaled in (5) to read $SNR/£n_p^2$. The QLM transmits at the FTN rate $C/W = n_p b$ compared to the $C/W = b$ rate for the Shannon bound. Modifying the Shannon bound to include the SNR scaling and the data symbol rate increase $n_p \geq 1$ transforms the Shannon bound to read $C/W \leq n_p \log_2(1 + SNR/£n_p^2)$. The QLM bound is the maximum "max" with respect to $n_p$ of this expression and yields (6)

$$C/W = \max_{np}\{n_p \log_2[1 + SNR/£n_p^2]\}, \text{Bps/HZ} \quad (6)$$

wherein the additional loss factor £ is measured for the ML demodulation in FIG. 9, 10 and for the trellis demodulation in FIG. 15, as a function of $n_p$ for a given data symbol modulation and QLM demodulation algorithm. This defines £=£($n_p$, data symbol modulation, QLM demodulation algorithm).

FIG. 4 QLM bound on C/W as a function of $E_b/N_o$, $n_p$, £ is derived from the QLM bound in (6) by substituting the definition for $E_b/N_o = SNR/(C/W)$ which yields (7)

$$C/W = \max_{np}\{n_p \log_2[1 + (E_b/N_o)(C/W)/£n_p^2]\}, \text{Bps/HZ} \quad (7)$$

The QLM scaling law (5) and bound (7) are re-derived using a geometric approach. A college level geometric derivation of the Shannon bound is modified for QLM to derive the scaling law and bound on C/W for a communication links. The derivation starts by assuming we transmit a $\log_2(M)$ bit equal-probable real signal M every $T_s$ seconds over the Nyquist frequency band $1/T_s = 1/T = B = W$ for complex sampling. The Nyquist sampling theorem specifies there are $n = 2T_s W$ independent real signal samples ($T_s W$ complex samples) in $T_s$. Each Tx QLM signal energy in each layer is restricted to an n-dimensional hyperspace of radius $[(S/£n_p)(T_s/n_p)]^{n/2}$ about the origin where $S/£n_p$ is the signal power available in each layer and $T_s/n_p$ is the portion of the $T_s$ that is available for demodulation of each layer allowed by the overlap of the signal which is equivalent to the scaling in (5). Each Rx QLM signal energy in each layer is restricted to a radius $r = [(S/£n_p)(T_s/n_p) + NT_s]^{n/2}$ where the noise energy is by definition $NT_s = N_o$. We assume a noise energy greater than NT will cause a signal detection error in estimating M. This means the number M of allowable signals that can be Rx without error in the n-dimensional signal space with volume $r^n = [(S/£n_p)(T_s/n_p) + NT_s]^{n/2}$ is bounded by $$\begin{aligned} M &\leq [((S/£n_p)(T_s/n_p) + NT_s)/(NT_s)]^{\wedge} n/2 \\ &= [(S/N)/£n_p^2 + 1]^{\wedge} n/2 \end{aligned} \quad (8)$$

which allows the channel capacity $C_p$ in Bps in each layer p to be derived $$\begin{aligned} C_p &= \log_2(M)/T_s \\ &= W \log_2[1 + SNR/£n_p^2] \end{aligned} \quad (9)$$

which derives the SNR scaling factor $n_p^2$ equivalent to deriving the scaling factor $n_p$ for $E_b/N_o$. The QLM channel capacity C is the sum of the capacity $C_p$ in each layer which yields $$C = n_p C_p \qquad (10)$$
$$= n_p W \log_2[1 + SNR/\pounds n_p^2]$$

Re-arranging (10) and taking the maximum with respect to $n_p$ yields the QLM bound in 1 in (6) for C/W.

FIG. 5 summarizes the properties which define this new QLM architecture. The first property 1 is the FTN data symbol rate $n_p W$ supported by QLM. The next property 2 is the QLM data rate C/W=$n_p$b that is higher than the Shannon data rate C/W=b since $n_p$>1. Property 3 is the Shannon bound on the data symbol metrics SNR≥(2^b−1), $E_b/N_o$≥(2^b−1)/b at the Shannon data rate C/W=b. Property 4 is the QLM bound on the data symbol metrics SNR≥$\pounds n_p^2$(2^b−1), $E_b/N_o$≥$\pounds n_p$ (2^b−1)/b at the QLM data rate C/W=$n_p$b. The last property 5) is the collection of available QLM demodulation algorithms including those disclosed in this specification.

FIG. 6 in time offset units of $T_s$ calculates the ideal triangular correlation 10, an example waveform 11 designated by p, and the waveform ψ correlation 12. Parameters of interest for this example square-root raised-cosine waveform are the waveform length L=3, M=16, and excess bandwidth α=0.22, the mainlobe 13 which extends over a $2T_s$ interval, and the sidelobes 14 which fall outside of the mainlobe. Parameter L is the waveform length in units of M=16 samples and M is the number of digital samples between adjacent waveforms at a Nyquist symbol rate=1/$T_s$ for which $T_s$=MT where 1/T is the digital sample rate and a is a measure of the roll-off of the frequency response. The ideal triangular correlation is the correlation for the pulse waveform of length $T_s$ in FIG. 2 and FIG. 7 demonstrates that for waveforms of interest for QLM the triangular correlation approximates the mainlobe correlations for QLM waveforms.

FIG. 7 in frequency offset units of 1/$T_s$ presents a N=64 point discrete Fourier transform DFT for OFDM in frequency, the correlation function, and an ideal correlation function in frequency for a pulse waveform in frequency. The correlation function closely approximates the waveform and the ideal correlation with a triangular mainlobe, and has a mainlobe 22 extending over 2/$T_s$=2B Hz interval with low sidelobes 23 wherein the symbol rate 1/$T_s$ is at the Nyquist rate and equal to the bandwidth B for each channel QLM demodulation algorithms include ML and MAP trellis algorithms, ML data packet algorithms, sequential relaxation algorithms, equalization, super-resolution and other algorithms. Sequential relaxation algorithms process the stream of data symbol samples to find the best estimates of the data symbols using sequential relaxation methods. These are computationally intensive and the least developed of the other algorithms. We first consider the ML algorithms in the architecture of data packets.

Figure 8:
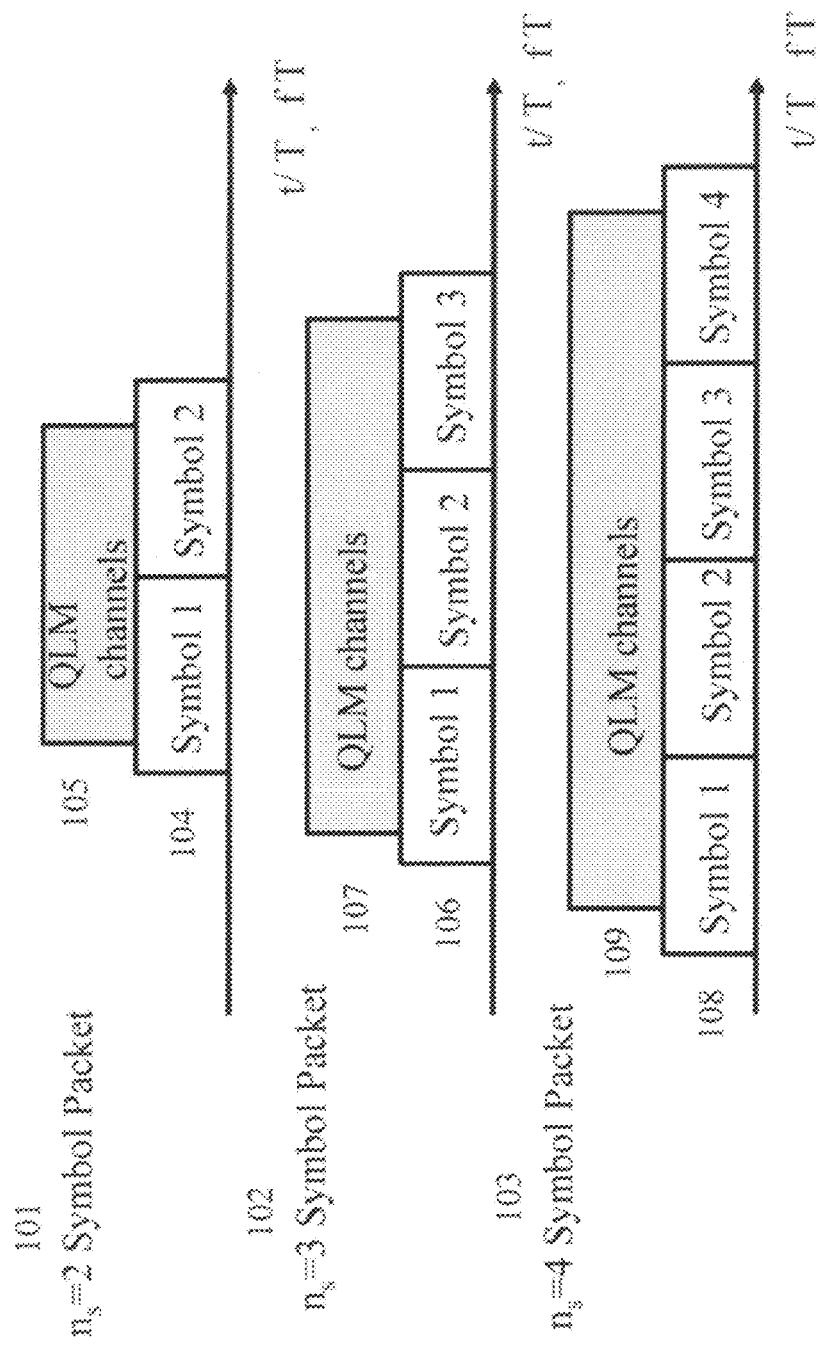

FIG. 8 presents a representative set of ML QLM data packet architectures for time differentiating parameters which support implementable ML demodulation algorithms with acceptable demodulation losses and with applicability to a broad spectrum of communications systems. ML algorithms solve the QLM system equations for the correlated signals to find estimates of the data symbols and are the least complex of the demodulation algorithms, are limited to a relatively few data symbols, and require the waveform correlation functions to approximate the ideal pulse correlations in FIG. 6,7. The three data packet architectures in FIG. 8 are a $n_s$=2-symbol group 101, a $n_s$=3-symbol group 102, and a $n_s$=4-symbol group 103, with each group respectively consisting of $n_s$=2, 3, 4 contiguous symbols 104,106,108 for the first QLM baseband signal $n_p$=1. QLM data signals for $n_p$>1 are transmitted over each group of symbols such that the additional QLM symbols stay within the composite bandwidth and packet duration for each symbol group. These architectures assume the sidelobes of the data symbols will be included in the trellis algorithms by an iterative algorithm similar to the sidelobe algorithm disclosed in FIG. 14. The QLM ML packet demodulation algorithm finds an estimate $\hat{X}$ of the Tx data symbol vector X in a QLM data packet in FIG. 8 by solving the Rx vector equation (12) in the detected data symbol Rx vector Y. Each row "k" of the Rx vector equation (12) is the detection equation (4) which defines the detected signal $y_k$ as a linear function of the correlated subset of Tx data symbols $\{d_k | \forall k\}$ within the packet and the AWGN. The correlation coefficients $\{c(|i|)|i=0, \ldots, N-1\}$ in (4) are the elements of the Rx system matrix H for the mainlobe correlation which is a symmetric $N_x$ by $N_x$ toeplitz correlation matrix over the ML data symbol packet in FIG. 9 where $N_x$ is the number of packet symbols $N_x$=[$(n_s-1)n_p+1$] and $n_s$=2, 3, 4 is the number of baseband symbols in a packet. Elements H(k,n) of H are the correlation values of the data symbol waveforms H(k,n)=<ψ(t−kT/$n_p$), ψ(t−nT/$n_p$)>=c(|k−n|) with diagonal elements H(k,k)=c(0)=1∀k where indices "k,n" are over the data symbols in the data packet. The size of the packet is limited to $n_s$=4 baseband data symbols to prevent the determinant of H from becoming too small and thereby causing the dispersion of the inverse $H^{-1}$ of H to be too large for reliable estimation of the data symbols in AWGN. The ML waveforms used to measure the performance data are the square pulses in FIG. 8 with triangular correlations in FIG. 6,7 and no sidelobes.

A ML data symbol packet (pulse group) in FIG. 8 consists of $n_s$=2, 3, 4 baseband square data symbols of length $T_s$, 1/$T_s$ for time, frequency square pulse waveforms. QLM overlays data symbol pulses over each pulse group $n_s$=2, 3, 4 by increasing the data symbol pulse rate and the matched filter detection in (2) recovers the elements of the Rx vector Y=[$y_1$ $y_2, \ldots, y_{Nx}$]$^T$ in (12) of the Tx data symbol vector X=[$x_1$, $x_2, \ldots, x_{Nx}$]$^T$ where N is the AWGN noise vector and the elements $\{x_k\}, \{y_k\}$ are defined in (4). From (4) the Rx vector equation for the mainlobe correlation is $$Y = HX + N \qquad (12)$$

where $Y = N_x \times 1$ detected symbol vector $H$ = correlation matrix of data symbols $X$ = data symbol vector over layered xxxxx Filters/channels $N$ = demodulation plus link noise vector $N_x$ = number of QLM channels (filters)

$= (n_s - 1)n_p + 1$ wherein the Rx data symbol vector Y has components $\{y_i\}$ over the set of channels or filters indexed on "i", Tx data symbol vector X has components $\{x_i\}$ indexed over the same set of channels or filters, and Rx noise vector N has components $\{N_i\}$ indexed over the same set of channels or filters.

The ML demodulation algorithm is derived in 4 in equations (13) for the system equations (12). We find ML demodulation algorithm (13)

1 ML Cost $J = [Y - HX]'Q^{-1}[Y - HX]$
   $= (-)$ exponent of the ML probability density function 2. ML solution $\hat{X}$ minimizes $J$
   $\hat{X} = [H'Q^{-1}H]^{-1}H'Q^{-1}Y$ 3 The noise covariance $Q$ is
   $Q = E[N\,N']$
   $= 2\sigma^2 H$ since the noise is correlated by the same filter overlap as the signal. This reduces the ML solution 2 to: the reduced ML demodulation algorithm $$\hat{X} = H^{-1}Y \quad (14)$$

wherein H' is the conjugate transpose of H, the inverse $H^{-1}$ exists for all waveforms of interest, and "$2\sigma^2$" is the root-mean-square rms data symbol detection noise.

The ML algorithm for QLM in equations (12), (13), (14) equally applies when using partial symbol $\Delta T_s$ integration wherein the integration intervals are over the separation between the consecutive layers of communications so that $\Delta T_s = T_s/n_p$. The correlation matrix for a full symbol integration is a symmetric Toeplitz matrix whereas using a $\Delta T_s = T_s/n_p$ integration interval reduces the matrix to a triangular form thereby offering a decrease in computational complexity and a more robust solution since the determinant of the correlation matrix will not become too small with relatively large data packets. However, the requirement to demodulate with a matched waveform makes it extremely difficult to use partial symbol $\Delta T_s$ integration.

FIG. 9 measures the ML bit error rate BER performance for uncoded 4PSK pulse waveforms for no QLM wherein $n_p=1$ and for $n_p=1, 2, 4, 8$ layers of QLM modulation using $n_s=2, 3, 4$ data symbol groups and implementing the ML symbol demodulation algorithm in (14). Performance validates QLM technology and scaling. QLM performance is plotted as bit error rate BER versus the QLM normalized value $(E_b/N_o)/n_p$ of the $E_b/N_o$. Measured performance values are from a direct error count Monte Carlo simulation of the trellis algorithm and are plotted as discrete measurement points. The additional scale factor £ is the separation of the BER performance from the reference performance for the baseband signal $n_p=1$. It is observed that £ is approximately equal to £=0, 1, 2 dB for packet sizes $n_s=2, 3, 4$ and is approximately independent of $n_p$.

Figure 10:
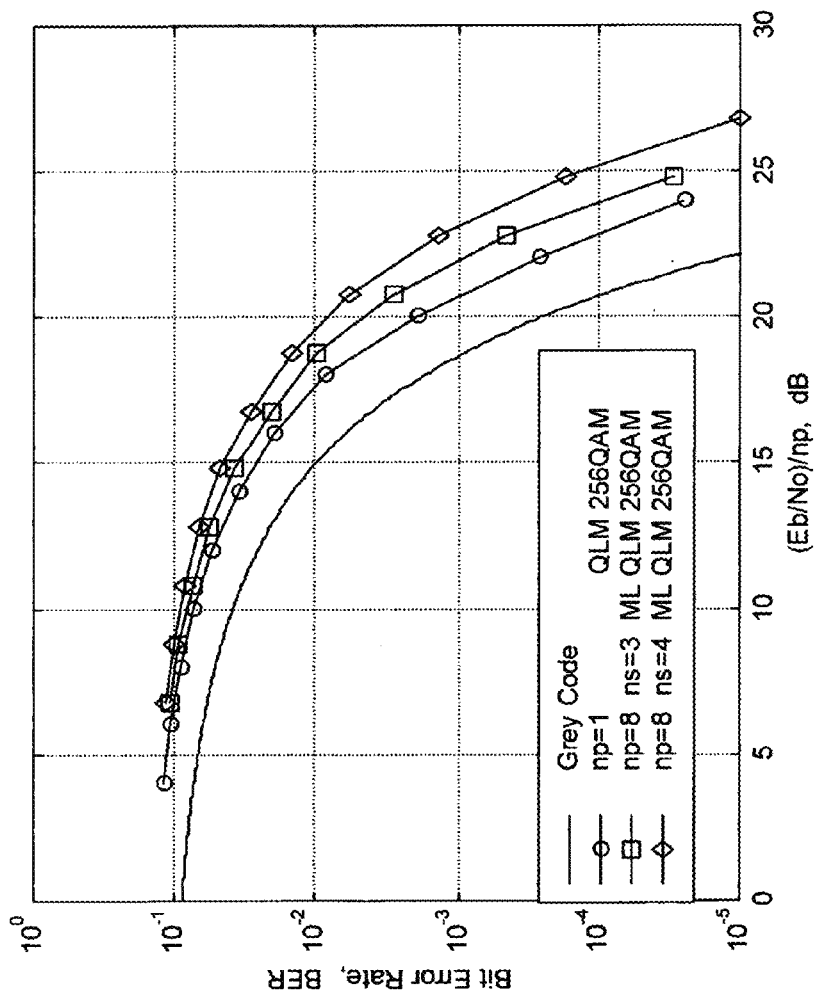

FIG. 10 measures the ML BER performance for uncoded 256QAM pulse waveforms for no QLM wherein $n_p=1$ and for $n_p=8$ layers of QLM modulation using $n_s=3, 4$ data symbol groups and implementing the ML symbol demodulation algorithm in (14). The 256QAM bound assumes a Grey code assignment of the data bits to the 256 data points in the complex plane and therefore provides improved performance compared to the 256 point regular data mapping used in the simulations. It is observed that the additional scale factor (demodulation loss) is approximately equal to £=0, 1, 2 dB for packet sizes $n_s=2, 3, 4$. Comparing FIG. 9 and FIG. 10 it is observed that £ is the same which means £ is independent of the modulation cardinality between 4PSK and 256QAM.

Figure 11:
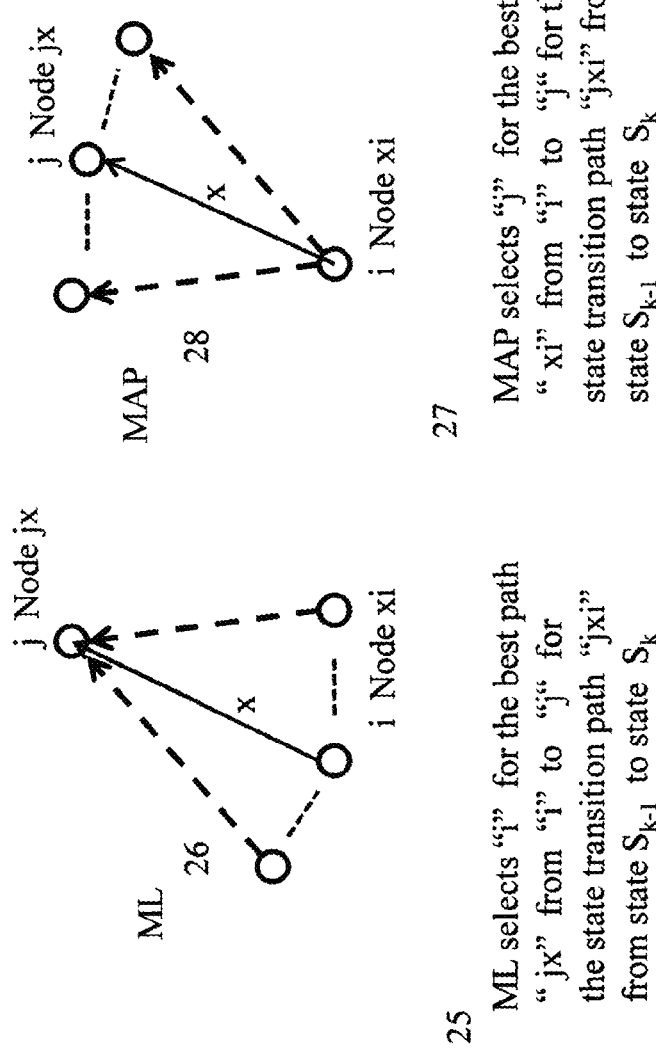

FIG. 11 introduces the trellis path selection in the ML and MAP trellis demodulation algorithms which unscramble the detected correlated signals in (4) to recover the information in the Tx data symbols. After down-conversion and synchronization the Rx QLM signal z(t) is processed as described in (4) to strip off the waveform $N_k$ by convolving the z(t) with the complex conjugate of $\psi_k$, to recover the correlated data symbol $y_k$ estimate of the Tx data symbol $x_k$. Trellis processing of the $y_k$ recovers the $m_k=1, 2, \ldots, 2\char`^b_s$ modulation states (alphabet elements) for each $x_k$ wherein $b_s$ is the number of uncoded bits in each data symbol $x_k$, the information bits $b=R\,b_s$ wherein R is the code rate, and the modulation states $m_k$ are the encoded complex symbols representing $x_k$.

This convolution is a correlation of the waveform with itself as illustrated in FIG. 6, since the waveforms are real and symmetric. QLM trellis demodulation algorithms process the mainlobes of the waveform correlation algorithms in the first pass and pick up the impacts of the sidelobes in subsequent passes. This iterative architecture provides a means to demodulate the stream of over-lapping and correlated QLM data symbol waveforms with reasonable computational requirements by processing the mainlobes and including the sidelobes in subsequent iterations. Correlation data in FIG. 6, 7 suggest this approach since the sidelobes are relatively low compared to the mainlobes for the bandwidth efficient waveforms being addressed.

MAP trellis algorithms have the correct architecture for reducing the number of trellis paths to enable higher order modulations to be used for larger numbers of overlapped QLM channels, compared to the maximum likelihood ML trellis algorithms which are derived from the ML trellis algorithms used for convolutional and Turbo decoding. Another critical property disclosed in U.S. Pat. No. 7,337,383 is that the MAP trellis algorithms are at least-as-good-as the ML trellis algorithms.

FIG. 12 trellis paths jxi for the ML and MAP trellis algorithms are paths from the set of xi nodes defining the previous state $S_{k-1}$ to the set of jx nodes defining the current state $S_k$. Path jxi reads from left to right, "j" is the new data symbol state, "i" is the last data symbol state, "x" is the string of path data symbol states between "j" and "i", and "k" is step k corresponding to the detected symbol $y_k$ in (4). Nodes designated by circles in FIG. 12 are the sets of symbols identified by their indices, state $S_{k-1}$ is the set of xi nodes for state k−1 and state $S_k$ is the set of jx nodes for state k. The data symbols in the transition paths jxi between nodes are the mainlobe correlation values in FIG. 6,7 encoded with the data modulations $m_x$. For a QLM signal which has $n_p$ simultaneous communications channels, there are $(2n_c-1)$ correlation values over the mainlobe which means each state $S_{k-1}, S_k$ has $2\char`^b_s(2n_p-2)$ nodes identified as $xi, jx$ respectively and there are $n_s\char`^(2n_c-1)=2\char`^b_s(2n_p-1)$ jxi paths from state $S_{k-1}$ to state $S_k$ data symbols wherein $2\char`^b_s$ is the number of possible modulation symbols $m_x$ or un-encoded states of each data symbol, Sidelobe correlations for $n_c>n_p$ are included in iterative MAP trellis demodulation algorithms and wherein $n_c$ is the number of one-sided correlation values including the sidelobes. As illustrated in FIG. 12 the ML algorithm selects the best path 25 by finding the xi which provides the best transitioning metric jxi from xi to jx from among the possible choices 26 for xi. The MAP algorithm selects the best path 27 by finding the jx which provides the best transitioning jxi from xi to jx from among the possible choices 28 for jx. The MAP is a co-state formulation of the trellis algorithm since it replaces the search over jx with a search over xi thereby enabling the number of paths specified by xi to be reduced along with the number of states in the trellis diagram and the computational complexity, and with minimal impact on performance.

MAP and ML trellis algorithms implement the decisioning rules in (15) for updating the path and state metric $\alpha_k(S_k)$ for each node in the trellis diagram $$\alpha_k(S_k) = \min\{\alpha_{k-1}(S_{k-1}) + R_k(S_{k-1} \to S_k) = R_k(jxi)\} \quad (15)$$
$$= \text{new metric for state } k$$

wherein min is with respect to $i$ for ML min is with respect to $j$ for MAP $\alpha_k(S_k) = p(y_k | S_k)$    for ML
$= p(S_k | y_k)$    for MAP $R_k(S_{k-1} \to S_k) = R_k(j \times i)$
$= |y_k - \hat{y}_k|^2 / 2\sigma^2$    for a ML metric
$= |x_k|^\wedge 2 - 2^*\text{Re}(y_k \hat{y}_k)^*\}$    for a MAP metric, wherein $(o)^*$ is the complex conjugate of $(o)$, the choice of a "min" or a "max" depends on the definition of $R(jxi)$, the $y_k$ refers to the correlated data symbol measurement at state or step $k$, the estimate $\hat{y}_k$ of $y_k$ is the correlated sum of the estimates $\{\hat{x}_k\}$ of the data symbols $\{x_k\}$, and the $R_k(S_{k-1} \to S_k) = R_k(jxi)$ is the state k transition decisioning metric for the transition written symbolically as $S_{k-1} \to S_k$ and realized in Matlab notation as "jxi".

FIG. 12 lists the Matlab code in a pseudo-code format for the calculation of the best trellis paths in and for the state updates for the ML and MAP trellis algorithms. For the best trellis path, the code translates the trellis algorithms in (15) written as a state metric update equation, into a Matlab code format for calculation of the state $S_k$ metric $\alpha_k(S_k)$ for the best trellis transition path. ML trellis algorithm finds the last symbol "i" with the best path "jx" to the new symbol "j" whereas the MAP algorithm finds the new symbol "j" with the best path "xi" from the last symbol "i" to support a reduction in the number of paths "xi" when necessary to reduce the computational complexity. For the state update for k≥D the state metric $S_k$ is upgraded for this new path jxi by the update operations $S_k(:,jx)=[y_k(jxi); S_{k-1}(1:D-1, xi)]$, $S_k(:,xi)=[y_k(jxi); S_{k-1}(1:D-1, jx)]$ respectively for ML, MAP using Matlab notation which replaces the column jx, xi vector with the column xi, jx vector after the elements of xi, jz have been moved down by one symbol and the new estimated symbol $\hat{x}_k$ added to the top of the column vector which is the row 1 element.

Figure 13A:
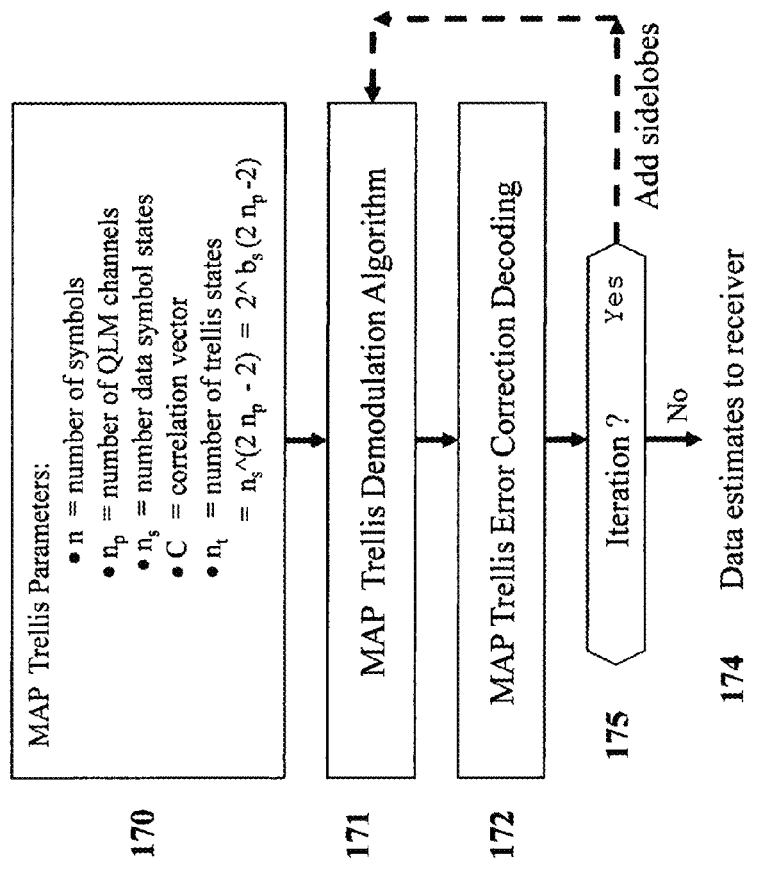
FIG. 13A is a flow diagram of a MAP trellis symbol demodulation algorithm.

FIG. 13A is a summary implementation flow diagram of a representative MAP trellis data symbol demodulation algorithm with error correction decoding and with the option of including the sidelobes in subsequent iterations. Basic elements of the algorithm are the trellis parameters 170, MAP trellis algorithm 171 structured by the parameter set in 170, and followed by trellis error correction decoding 172 which also could be combined with the trellis demodulation, and with the option 175 to include the sidelobes in an iteration(s) or to end the iteration(s) and handover 174 the data estimates to the receiver. The parameter set 170 is applicable to the mainlobes of the data symbol waveforms with two examples illustrated in FIG. 6,7. The correlation function for the data symbol waveforms defined in FIG. 6,7 have low sidelobes compared to the mainlobes which suggests it is sufficient to consider mainlobe correlation in the MAP trellis algorithm with the sidelobes included in subsequent iterations. A one-sided correlation vector C is used since the correlation is symmetrical about the origin, whose elements are the mainlobe correlation coefficients $C=[c(0), c(1), \ldots, c(n_p-1)]$ wherein $c(0)=1$ with waveform normalization. Waveform modulations emphasized are 4PSK, 8PSK, 16QAM, 64QAM, 256QAM with $b_s$=2, 3, 4, 6, 8 uncoded bits per data symbol and $n_s=2^\wedge b_s=$4, 8, 16, 64, 256 states per data symbol.

Figure 13B:
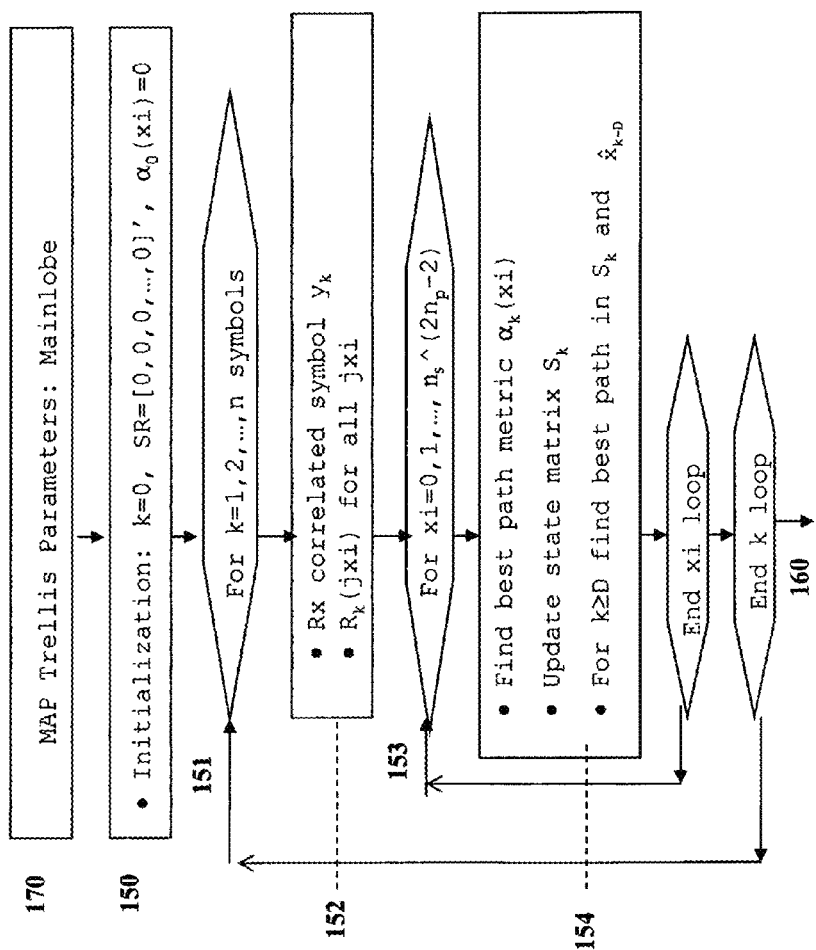
FIG. 13B is the continuation of the flow diagram of the MAP trellis symbol demodulation algorithm.
Figure 13C:
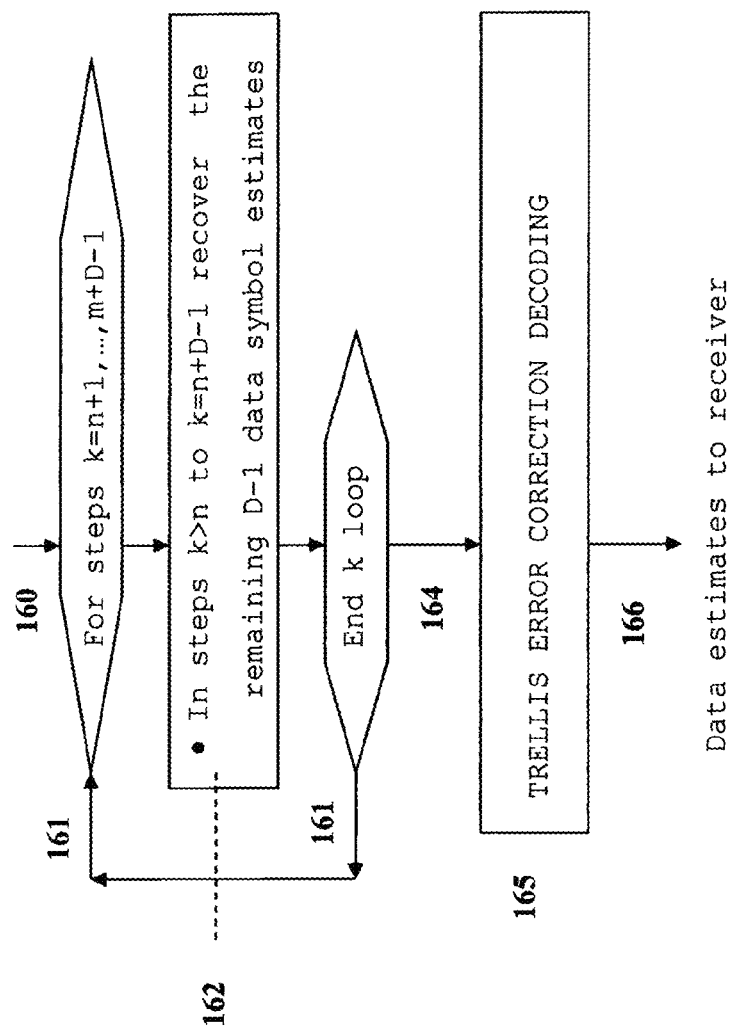
FIG. 13C is the continuation of the flow diagram of the MAP trellis symbol demodulation algorithm.

FIG. 13B,13C is a detailed implementation flow diagram of the MAP trellis data symbol demodulation algorithm in FIG. 13A for mainlobe demodulation. FIG. 13B uses the trellis parameters 170 in the initialization 150 prior to the start k=0 with an empty shift register (SR) which normally contains the $2n_p-1$ correlated data symbols for the mainlobe for each node being addressed. At k=0 the path metric $\alpha_0(xi)$ is set equal to a negative or zero initialization constant for all of the nodes $xi=0, 1, 2, \ldots, (n_s^\wedge(2n_p-2)-1)$ of the trellis diagram where $\alpha_0(xi)$ is the logarithm of the state $S_0$ path metric at k=0 for node xi, the receive Rx symbols are indexed over k with k=0 indicating the initial value prior to the Rx symbol k=1, nodes of the trellis diagram are the states of the shift register SR, and state $S_k$ refers to the trellis diagram paths and metrics at symbol k in the trellis algorithm.

In FIG. 13B loop 151 processes the Rx symbols k=1, 2, ..., n where the index k also refers to the corresponding algorithm steps and the states of the trellis algorithm. In 152 the Rx signals are pulse detected to remove the carrier frequency and waveform to recover the normalized correlated data symbol $y_k$. For each Rx symbol $y_k$ the state transition decisioning metrics $R_k(jxi)$ are calculated by the transition metric equations $\{R_k(jxi)=-|y_k-\hat{y}_k|(jxi)^\wedge 2\}$ for a ML metric, $\{R_k(jxi)=|y_k|^\wedge b-2\text{Real}(y_k\hat{y}_k(jxi))^*\}$ for a MAP metric wherein $(o)^*$ is the complex conjugate of $(o)$, for $\{R_k(jxi)=\text{Metric}(y_k,\hat{y}_k)\}$ for another metric, for all possible transition paths $\{jxi\}$ from the previous state $S_{k-1}(xi)$ at node xi to the new state $S_k(jx)$ at node jx in the trellis diagram and where $\hat{y}_k(jxi)$ is the hypothesized normalized detected correlated symbol k for the path jxi. For a mainlobe correlation function the $\hat{y}_k(jxi)$ is defined by the equation $\hat{y}_k(jxi)=C(n_p-1)[sr(1)+sr(2n_p-1)]+ \ldots +c(1)[sr(n_p-1)+sr(n_p+1)]+c(0)[sr(n_p)]$ which calculates $\hat{y}_k(jxi)$ as the correlated weighted sum of the elements of the shift register $SR=[sr(1), sr(2), \ldots, sr(2n_p-1)]'$ with $\hat{x}_k=sr(n_p)$, $\hat{x}S_{k-1}=sr(n_p-1)$, $\hat{x}_{k+1}=sr(n_p+1), \ldots$ where $c(0)=1$, the normalized data symbol estimates $\{\hat{x}_k\}$ correspond to the transition index jxi, and the state k estimated symbol $\hat{x}_k$ is the SR center element $sr(n_p)$ with correlation coefficient $c(0)=1$. Symbols move from left to right starting with "j" with each new Rx symbol or step in the trellis recursion algorithm, and ending with "i". With this convention "j" is indexed over the states of sr(1), "x" is indexed over the current states of $sr(2), \ldots, sr(2n_p-2)$, and "i" is indexed over the states of $sr(2n_p-1)$. Index over the paths of the trellis diagram is defined by the equation $jxi=sr(1)+n_s sr(2)+n_s^\wedge 2sr(3)+ \ldots +n_s^\wedge(2n_p-2)sr(2n_p-1)-1=0, 1, 2, \ldots, n_s^\wedge(2n_p-1)-1$ when the contents of the SR elements are the indices corresponding to the assumed data symbol state values.

In FIG. 13B loop 153 calculates the best trellis transition paths from state $S_{k-1}$ to the new state $S_k$ for $xi=0, 1, 2, \ldots, n_s^\wedge(2n_p-2)-1$. In 154 the path metric $\alpha_k(S_k)$ is defined by the recursive logarithm equation $\alpha_k(S_k)=\alpha_{k-1}(S_{k-1})+R_k(S_{k-1} \to S_k)$ which can be rewritten as $\alpha_k(xi)=\alpha_{k-1}(jx)+R_k(jxi)$ since $\alpha_k(S_k)=P(S_k|y_k)=\alpha_k(xi)$, $\alpha_{k-1}(S_{k-1})=p(S_{k-1}|y_{k-1})=\alpha_{k-1}(jx)$, $R_k(S_{k-1} \to S_k)=R_k(jxi)$ from equation (5). The best path metric $\alpha_k(xi)$ for each new node jx is chosen by the decisioning equation $\alpha_k(xi)=\min\{\alpha_{k-1}(jx)+R_k(jxi)\}$ with respect to the admissible "j". For each jx, the corresponding xi yielding the highest value of the path metric $\alpha_k(xi)$ is used to define the best path and new symbol $\hat{x}_{k-D}$.

Figure 14:
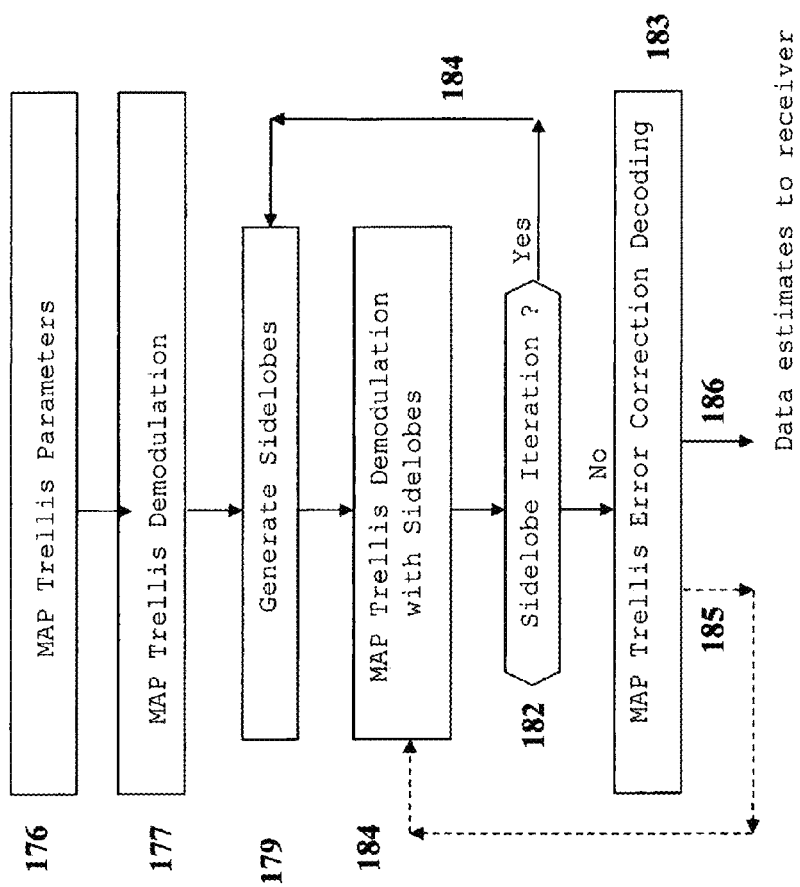
FIG. 14 is a flow diagram of the MAP trellis symbol demodulation algorithm with iteration to include the sidelobes.

FIG. 14 is a flow diagram of an iterative version of the MAP data symbol trellis algorithm in FIG. 13 wherein the iteration is used to incorporate the effects of the sidelobes of the correlation function C into the trellis state transition metric $R_k(jxi)$ in 152 in FIG. 13B with a relatively small increase in computational complexity. In FIG. 14 the algorithm is initialized with the parameter set in 176 which is the parameter set in 170 in FIG. 13A with the partitioning of the correlation vector C into the mainlobe vector $C_0$ plus the sidelobe vector $C_1$ and adding the specification of the stopping rule for the iterations. For a correlation vector $C=[c(0), c(1), \ldots, c(n_p-1), c(n_p), \ldots, c(n_c)]$ consisting of $n_c$ correlation coefficients, the mainlobe vector is $C_0=[c(0), c(1), \ldots, c(n_p-1), 0, 0, \ldots, 0]$ and the sidelobe vector is $C_1=[0, 0, \ldots, 0, c(n_p), \ldots, c(n_c)]$ to partition $C=C_0+C_1$. The algorithm starts 177 by implementing the MAP algorithm in FIG. 12.

In FIG. 14 the output data symbol estimates 164 in FIG. 13C are the outputs from the MAP algorithm in 177 and are used to calculate the a-priori estimated sidelobe contribution $\hat{y}_{k|1}$ in 179 to $\hat{y}_k(jxi)$ which is the hypothesized normalized detected correlated symbol k for the path jxi in the calculation of the metric $R_k(jxi)$ in 152 in FIG. 13B. In this implementation 180 of the trellis algorithm 171 in FIG. 14A, the $\ddot{y}_k(jxi)=\hat{y}_{k|0}(jxi)+\hat{y}_{k|1}$ is the sum of the hypothesized mainlobe contribution $\hat{y}_{k|0}(jxi)$ using the non-zero $C_0$ coefficients as described in FIG. 13A and the sidelobe contribution $\hat{y}_{k|0}$ using the data symbol estimates from 177 and the non-zero $C_1$ coefficients and wherein the subscripts "k|0" reads "index k given $C_0$" and "k|1" reads "index k given $C_1$". From 152 in FIG. 13B we find the $\hat{y}_{k|0}(jxi)$ is defined by the equation $\hat{y}_{k|0}(jxi)=c(n_p-1)[sr(1)+sr(2n_p-1)]+ \ldots +c(1)[sr(n_p-1)+sr(n_p+1)]+c(0)[sr(n_p)]$ which calculates $\hat{y}_{k|0}(jxi)=\hat{y}_k(jxi)$ in FIG. 13B as the correlated weighted sum of the elements of the shift register $SR=[sr(1), sr(2), \ldots, sr(2n_p-1)]'$ with $\hat{x}=sr(n_p)$, $\hat{x}_{k-1}=sr(n_p-1)$, $\hat{x}_{k+1}=sr(n_p+1)$, $\ldots$ where $c(0)=1$, the normalized data symbol estimates $\{\hat{x}_k\}$ correspond to the transition index jxi, and the state k estimated symbol $\hat{x}_k$ is the SR center element $sr(n_p)$ with correlation coefficient $c(0)=1$. Symbols move from left to right starting with "j" with each new Rx symbol or step in the trellis recursion algorithm, and ending with "i". With this convention "j" is indexed over the states of $sr(1)$, "x" is indexed over the current states of $sr(2), \ldots, sr(2n_p-2)$, and "i" is indexed over the states of $sr(2n_p-1)$. Index over the paths of the trellis diagram is defined by the equation $jxi=sr(1)+n_s sr(2)+n_s\hat{\ }2sr(3)+ \ldots +n_s(2n_p-2)sr(2n_p-1)-1=0, 1, 2, \ldots, n_s\hat{\ }(2n_p-1)-1$ when the contents of the SR elements are the indices corresponding to the assumed data symbol state values. The sidelobe contribution is equal to $\hat{y}_{k|1}=c(n_p)(\hat{x}_{k-n_p}+\hat{x}_{k+n_p})+c(n_p+1)(\hat{x}_{k-1-n_p}+\hat{x}_{k+1+n_p})+c(n_p+2)(\hat{x}_{k-2-n_p}+\hat{x}_{k+2+n_p})+ \ldots$ until the end of the sidelobe correlation coefficients or the end of the data symbol bit estimates and wherein $\hat{x}_{k-n_R}$ is the data symbol estimate in 180 for symbol $k-n_p$. A stopping rule in 182, 184 is used to decide if another iteration is required. When another iteration is required the data symbol bit estimates are used to update the calculation of the a-priori contribution $\hat{y}_{k|1}$ of the sidelobes to the $\hat{y}_k(jxi)$ in the modified trellis algorithm 184. After the iteration is stopped the outputs are error corrected decoded 183 and handed over to the receiver. A possible alternative path is to use the decoded output estimates 185 to re-start 184 the MAP trellis demodulation algorithm with sidelobes.

FIG. 15 measures the trellis decoding performance for uncoded 4PSK pulse waveforms for no QLM wherein $n_p=1$ and for $n_p=2, 3, 4$ layers of QLM modulation using the trellis data symbol decoding algorithm in FIG. 13 and for $n_p=4, 6$ layers by implementing a ½-word trellis data symbol decoding algorithm. Performance validates QLM technology and scaling. QLM performance is plotted as BER versus the QLM normalized value $(E_b/N_o)/n_p$ of the $E_b/N_o$. Measured performance values are from a direct error count Monte Carlo simulation of the trellis algorithm and are plotted as discrete measurement points. The results from FIG. 9, 10 prove that higher order modulations 8PSK, 16QAM, 64QAM, 256QAM will have the same relative trellis coding £ performance which is approximately equal to £=0, 0.5, 1.5, 3.5 dB for $n_p=2, 3, 4, 6$ FTN data symbol rates relative to the Nyquist rate $n_p=1$.

FIG. 16,17 calculate the QLM data rate C/W vs. $E_b/N_o$, SNR respectively using the MAP trellis demodulation and ML packet demodulation algorithms. Performance calculated are the Shannon bound, new bound, 4PSK, 8PSK, 16QAM, 64QAM, 256QAM, 4096QAM, MAP trellis demodulation, and ML demodulation communications. Equation (1) is used to calculate the Shannon bound, equation (7) is used to calculate the new bound, modulation performance for 4PSK, 8PSK, 16QAM, 64QAM, 256QAM, 1024QAM assumes turbo coding performance provides a performance almost equal to the Shannon bound and with information rate b=1.5, 2, 3, 4, 6, 8 bits=Bps/Hz respectively assuming coding rates R=3/4, 2/3, 3/4, 2/3, 3/4, 2/3 and bits per symbol $b_s$=1.5, 2, 3, 4, 6, 8 bits respectively for 4PSK, 8PSK, 16QAM, 64QAM, 256QAM, 4096QAM.

FIG. 18 parameters 121 are used to calculate the MAP trellis and ML demodulation performance. MAP parameter values 122 are selected to provide best values for b while avoiding excessive values of the FTN rate $n_p$ which increase the sidelobe induced demodulation loss and increase the required synchronization accuracy to support the $n_p$. Plot point 5 lists two alternative candidates to achieve b=24 Bps/Hz which are: 64QAM requires $n_p$=6 layers and $E_b/N_o$=17.3 dB, and 256QAM requires a lower $n_p$=4 FTN rate and a slightly higher $E_b/N_o$=18.2 dB. The 256QAM appears to be the preferred candidate since the $n_p$ is somewhat lower. ML parameter values 1, 2, 3 for the $n_s$=3 data symbol group assume $n_p$=4 QLM layers and the resulting performance in FIG. 16,17 is considerable lower than the MAP performance in FIG. 16,17. ML performance approaches the MAP performance in FIG. 16,17 for a $n_s$=4 data symbol group with increased value of the FTN rate $n_p$=6.

FIG. 19 is a proof-of-concept demonstration that QLM can provide a data rate which is substantially faster than the Shannon rate in (1), (11) with $n_p$=1, and in FIG. 17, 18. We use as a reference the performance for 256QAM at the Shannon rate which is C/W=6 Bps/Hz in FIG. 17 for $E_b/N_o$=10.21 dB which is the highest data rate mode for cellular communications and for almost all of the other communications links and applications. We observe that starting with 16QAM at the Shannon rate which is C/W=3 Bps/Hz for $E_b/N_o$=3.68 dB we can increase the data symbol rate to $n_p$=2, 3 times the 3 Bps/Hz whereupon the QLM performance is C/W=6, 9 Bps/Hz respectively for $E_b/N_o$=6.69, 8.95 dB which C/W is observed to be substantially above the Shannon bound or rate. Likewise it is observed that starting with 64QAM at the Shannon rate which is C/W=4 Bps/Hz for $E_b/N_o$=5.74 dB we can increase the data symbol rate to $n_p$=2, 3 times the 4 Bps/Hz whereupon the QLM performance is C/W=8, 12 Bps/Hz respectively for $E_b/N_o$=8.75, 11.01 dB which C/W is observed to be substantially above the Shannon bound or rate. This completes the proof-of-concept demonstration which complements the proof-of-concept in FIG. 17, 18.

FIG. 20 is an OFDM transmitter block diagram modified to support OFDM QLM with frequency offsets as the differentiating parameter to increase the symbol transmission rate from $1/T_s$ to the QLM rate $n_p/T_s$ and with an increase in transmitter power to support this increased data rate. FIG. 20 differs from the IEEE WiFi 802.16 standard in the deletion of the 4.0 μs delay between the FFT output NT and the Tx FFT output $NT_s=NT+4.0$ μs, and in the use of the complete FFT band for transmission, in order to apply to all of the IEEE standard OFDM systems. Ideal OFDM modulates N input data symbols at the sample rate $1/T_s$ over the time interval $NT_s$ with an N-point inverse fast fourier transform $FFT^{-1}$ to generated N harmonic waveforms $e^{j2\pi kn/N}$ with each modulated by the corresponding data symbol wherein the normalized frequencies k=0, 1, . . . N−1 correspond to channels 0, 1, . . . , N−1, "j"=√(−1), "π=pi", and "n" is a time index. Data symbol output rates are $1/NT_s$ per channel and the N channels have a total symbol rate equal to $N/NT_s=1/T_s=B$=(Nyquist sample rate). Signal processing starts with the stream of user input data words $\{d_k\}$ 46 with k indexed over the words. Frame processor 47 accepts these data words and performs turbo error correction encoding, error detection cyclic redundant encoding CRC, frame formatting, and passes the outputs to the symbol encoder 48 which encodes the frame data words into data symbols for handover to the OFDMA QLM signal processing. QLM transmits in parallel N Rx data symbols for each of the $n_p$ $FFT^{-1}$ signal processing steams. Each set of Rx N data symbols are offset in frequency by 0, Δk, 2Δk, . . . , $(n_p-1)$Δk with $\Delta k=1/n_p$ using the normalized frequency index k and are implemented in 49 by the frequency translation operator with $FFT^{-1}$ time sample index n. Following this frequency translation and $FFT^{-1}$ signal processing, the output streams of the OFDMA encoded symbols for the $n_p$ frequency offsets are summed 51 and waveform encoded. The output stream of up-sampled complex baseband signal samples 52 $\{z(t_i)\}$ at the digital sample times $t_i$ with digitization index i, is handed over to the digital-to-analog converter DAC, and the DAC output analog signal z(t) is single sideband SSB upconverted 52 to RF and transmitted as the analog signal v(t) wherein v(t) is the real part of the complex baseband signal z(t) at the RF frequency. Non-ideal OFDMA has a separation interval between contiguous $FFT^{-1}$ data blocks to allow for timing offsets and the rise and fall times of the channelization filter prior to the $FFT^{-1}$ processing.

FIG. 21 is a OFDM receiver block diagram modified to support OFDM QLM from the OFDM QLM transmitter in FIG. 20. Receive signal processing for QLM demodulation starts with the wavefronts 54 incident at the receiver antenna for the $n_u$ users u=1, . . . , $n_u \leq N_c$ which are combined by addition in the antenna to form the receive Rx signal $\hat{v}(t)$ at the antenna output 55 where $\hat{v}(t)$ is an estimate of the Tx signal v(t) 52 in FIG. 20 that is received with errors in time Δt, frequency Δf, and phase Δθ. This Rx signal $\hat{v}(t)$ is amplified and downconverted to baseband by the analog front end 56, synchronized (synch.) in time t and frequency f, waveform removed to detect the Rx QLM signal at the QLM symbol rate, inphase and quadrature detected (I/Q), and analog-to-digital ADC converted 57. ADC output signal is demultiplexed into $n_p$ parallel signals 58 which are offset in frequency by 0, −Δk, −2Δk, . . . , $-(n_p-1)$Δk wherein $\Delta k=1/n_p$ and processed by the FFT's. Outputs are trellis decoded 59 and further processed 60,61 to recover estimates of the Tx data $d_k$ with k indexed over the data words.

FIG. 22 is an ideal LTE SC-OFDM transmitter block diagram modified to support SC-OFDM QLM with timing offsets as the differentiating parameter to increase the symbol transmission rate from $1/T_s$ to the QLM rate $n_p/T_s$ and with an increase in transmitter power to support this increased data rate. FIG. 22 is ideal in the assumption of the use of orthogonal Wavelet multiplexing OWDM disclosed in U.S. Pat. No. 7,376,688 wherein the Wavelets provide ideal communications performance in that the symbol rates $1/T_s$ are equal to the bandwidth $B=1/T_s$ and they are orthogonal in frequency offsets $1/T_s$ and time offsets $T_s$, and the transmission is over a single channel and bandwidth in order to apply to all of the IEEE standard SC-OFDM LTE systems. Obviously, the transmitter block diagram applies to other waveforms equivalent to the Wavelet. Signal processing starts with the stream of user input data words $\{d_k\}$ 111 with k indexed over the words. Frame processor 112 accepts these data words and performs the turbo error correction encoding, error detection cyclic redundant encoding CRC, frame formatting, and passes the outputs to the symbol encoder 113 which encodes the frame data words into data symbols for handover to the OWDM QLM transmit signal processing. The $n_p$ time delays 0, $\Delta T_s$, $2\Delta T_s$, $3\Delta T_s$, . . . , $(n_p-1)\Delta T_s$ wherein $\Delta T_s=T_s/n_p$, are performed 114 and the output streams of the OWDM waveform encoded 115 symbols for the $n_p$ time delays are summed 116 and passband waveform encoded and the up-sampled output stream of complex baseband signal samples 117 $\{z(t_i)\}$ at the digital sample times $t_i$ with digitization index i, is handed over to the DAC and the DAC output analog signal z(t) is single sideband SSB upconverted 117 to RF and transmitted as the analog signal v(t) wherein v(t) is the real part of the complex baseband signal z(t) at the RF frequency. It is convenient to refer to the OFDM LTE communications as LTE(OFDM).

FIG. 23 is a LTE SC-OFDM QLM receiver block diagram modified to support SC-OFDM QLM from the transmitter in FIG. 22. Receive signal processing for QLM demodulation starts with the wavefronts 131 incident at the receiver antenna for the $n_u$ users u=1, . . . , $n_u \leq N_c$ which are combined by addition in the antenna to form the receive Rx signal $\hat{v}(t)$ at the antenna output 132 where $\hat{v}(t)$ is an estimate of the Tx signal v(t) 117 in FIG. 22 that is received with errors in time Δt, frequency Δf, and phase ΔO. This Rx signal $\hat{v}(t)$ is amplified and downconverted to baseband by the analog front end 133, synchronized (synch.) in time t and frequency f, waveform removed to detect the Rx QLM signal at the QLM symbol rate, inphase and quadrature detected (I/Q) and analog-to-digital ADC converted 134. ADC output signal is demultiplexed into $n_p$ parallel signals 135 which are offset in time by 0, $\Delta T_s$, $2\Delta T_s$, . . . , $(n_p-1)\Delta T_s$ and processed by the OWDMA decoders. Outputs are trellis decoded 136 with an algorithm comparable to the algorithm defined in FIG. 9. Outputs are further processed 137,138 to recover estimates of the Tx data $d_k$ wherein k is indexed over the data words.

FIG. 24 illustrates a representative segment of current cellular communications networks with a schematic layout of part of a cellular network which depicts cells 1,2,3,4 that partition this portion of the area coverage of the network, depicts a user (network user) 5 located within a cell with forward and reverse communications links 6 with the cell-site base station (access point/hub) 7, depicts the base station communication links 8 with the MSC (mobile switching center) or the WSC (wireless switching center) 9, and depicts the MSC/WSC communication links with another base station (access point/hub) 17, with another MSC/WSC 16, and with external elements 10,11,12,13,14,15. One or more base stations are assigned to each cell or multiple cells or sectors of cells depending on the application. One of the base stations 9 in the network serves as the MSC/WSC which is the network system controller and switching and routing center that controls all of user timing, synchronization, and traffic in the network and with all external interfaces including other MSC's. External interfaces could include satellite 10, PSTN (public switched telephone network) 11, LAN (local area network) 12, PAN (personal area network) 13, UWB (ultra-wideband network) 14, and optical networks 15. As illustrated in the figure, base station 7 is the nominal cell-site station for cells i−2, i−1, i, i+1 identified as 1, 2, 3, 4, which means it is intended to service these cells with overlapping coverage from other base stations (access points/hubs). The cell topology and coverage depicted in the figure are intended to be illustrative and the actual cells could be overlapping and of differing shapes. Cells can be sub-divided into sectors. Not shown are possible subdivision of the cells into sectors and/or combining the cells into sectors. Each user in a cell or sector communicates with a base station which should be the one with the strongest signal and with available capacity. When mobile users cross over to other cells and/or are near the cell boundary a soft handover scheme is employed for CDMA in which a new cell-site base station is assigned to the user while the old cell-site base station continues to service the user for as long as required by the signal strength.

FIG. 25 depicts a MIMO scenario for the cellular networks in FIG. 24 (2) using the multiple access OFDM QLM and SC-OFDM QLM communications encoding of the encoded data symbols transmitting signal information, followed by space-time coding $H_0, C_0, L$ as disclosed in U.S. Pat. No. 7,680,211 for the communications architecture consisting of N Tx antennas 106 communicating through a scintillated, dispersive, fading, and multipath links 107 to M Rx antennas 108 for the forward communications links for the cellular communications 6 from the access point or hub 7 to the network user 5 in FIG. 24. Transmission starts with the input Tx data d 101 which is encoded, interleaved, formatted, and data symbol encoded 102 followed by the OFDM QLM and SC-OFDM QLM encoding 103 to generate the input signal (symbol) vector X 104 whose elements are the encoded data symbols from 103. This encoding includes the Tx signal processing required to support Rx signal processing equalization such as frequency domain equalization (FDE) and Wavelet domain equalization (WDE) to correct for scintillation, dispersion, fading, and multipath. Tx symbol vector X is space-time encoded 105 using $H_0/H, C_0, L$ where $(H_0/H)$ is equal to $H_0$ with the elements of H removed since they are generated by the Tx-to-Rx communication links, and handed over to the Tx antenna subsystem which performs the digital-to-analog conversion, symbol waveform modulation, single-side-band upconversion, power amplification, and transmission by the antenna elements for each of the N Tx transmissions by the access point or hub. Rx signals received by the network user antennas are amplified, filtered, down-converted, detection filtered and analog-to-digital converted to recover the Rx symbol vector Y 109. Space-time decoding 110 defined in scenarios 1,2,3,4 is implemented to recover the ML estimates $\hat{x}$ 111 of X which are processed by the OFDM QLM and SC-OFDM QLM decoding and equalization 112 followed by deinterleaving and turbo decoding 113 to recover the ML estimates $\hat{d}$ 114 of the Tx data d 101.

A multi-scale MS code can be implemented with modest complexity in order to improve the bit-error-rate BER performance of OFDM/LTE(OWDM), WiFi, WiMax, SC-OFDM QLM by spreading each Tx data symbol over the data band and over the data packet. This technique has been disclosed in U.S. Pat. No. 7,907,512. Jensen's inequality from mathematical statistics proves that this uniform spreading of the transmit signals using MS provides the best communications BER performance.

This patent covers the plurality of everything related to communications faster than the Shannon bound for WiFi, WiMax, LTE, OFDM, and SC-OFDM waveforms, demodulation for WiFi, WiMax, LTE, OFDM, and SC-OFDM waveforms and all new and forthcoming waveforms and IEEE communications standards, to QLM generation and data recovery of QLM, to the corresponding bounds on QLM, to all QLM inclusive of theory, teaching, examples, practice, and to implementations for related technologies. The representative trellis and ML algorithms for QLM demodulation are examples to illustrate the methodology and validate the performance and are representative of all QLM demodulation algorithms including all maximum likelihood ML architectures, maximum a posteriori MAP trellis and ML trellis architectures, maximum a priori, finite field techniques, direct and iterative estimation techniques, trellis symbol and iterative trellis symbol and with/without simplifications, trellis bit and iterative trellis bit and with/without simplifications and with/without bit error correction coding, sequential relaxation, equalization, super-resolution, and all other related algorithms whose principal function is to recover estimates of the Tx symbols and information for QLM modulation and the QLM increase in the data symbol rates as well as data recovery related to QLM and the QLM bounds.

The QLM architectures disclosed in this patent and previous related patents are representative examples of the means used to communicate faster than the Shannon bound and do not restrict the selection of the communications properties useful for communicating faster than the Shannon bound.

The patent covers the two groups of applications discussed in this specification which use the time and frequency differentiating parameters for enabling separation of the overlapped data symbols. Time differentiation transmits data symbols in time at the QLM rate $n_p/T_s$ in a continuous or data packet architecture. Frequency differentiation transmits data symbols in frequency at the QLM frequency separation $1/n_p T_s$ in each $FFT^{-1}$ data packet. Both time and frequency data symbols are transmitted for QLM at the FTN rate $n_p W$ when the FTN rate W is the Shannon bound data symbol rate $1/T_s = W$. This specification also applies to combinations of time and frequency differentiating parameters as well as other differentiating parameters including beam forming, optical wavelength, and MIMO.

This patent covers the plurality of everything related to QLM which has been disclosed in this and previous patents to consist of all methods and means to increase the communications data rates while introducing scaling or other possible performance improvements or combinations thereof to compensate for the impact of ISI and other communications link imperfections in reducing the available signal energy for demodulation and decoding to recover the communications information. The example applications in this invention disclosure have used a restricted version of QLM in order to derive the data rate performance to compare with the Shannon rate.

What is claimed is:

1. A method for communications faster than the Shannon upper bound on the communications data rate over a frequency band W of a carrier frequency by transmitting the communications data symbols at a faster than Nyquist (FTN) rate using layering of the communications to increase the data symbol rate and using scaling of the data symbols to compensate for intersymbol demodulation losses, said method comprising the steps of:

using the Shannon data symbol metrics SNR≥(2^b−1), $E_b/N_o \geq (2^b-1)/b$ for communications at the data symbol rate $1/T_s \leq W$ over the frequency band W where $1/T_s = W$ is the Nyquist rate which is equal to the frequency band W, "b" is the information bits in each data symbol, the equality is the Shannon bound on the maximum data rate which can be transmitted over W, SNR is the signal-tonoise power ratio, $E_b/N_o$ is the ratio of the data symbol bit energy $E_b$ to the noise power density $N_o$, $T_s$ is the data symbol separation in time, using the quadrature layered modulation (QLM) data symbol metrics $SNR \geq £n_p^2(2^b-1)$, $E_b/N_o \geq £n_p(2^b-1)/b$ for communications at the data symbol rate $n_pW$ faster than the Nyquist rate $W$ and at the data rate $n_pbW$ faster than the Shannon bound $bW$ in Bits/Second since the Nyquist rate is at the Shannon bound, wherein $n_p \geq 1$ is the increase in the data symbol rate beyond the Nyquist rate and the Shannon bound and is the number, $n_p$, of QLM communications layers with each layer at the Nyquist rate and the Shannon bound, $£ \geq 1$ is a scaling correction to the $n_p$ scaling to compensate for the loss in the recoverable data symbol energy in a demodulator caused by the interference of the overlapping data symbols, and the equality is the QLM bound, transmitting and receiving said QLM communications signal over a QLM communications link consisting of a modulated stream of said data symbols with a waveform at a $n_p/T_s$ symbol rate, recovering data symbols of the QLM scaled communications signals in a receiver using a demodulation algorithm, and combining said algorithm with error correction decoding to recover the QLM transmitted information; whereby time offsets between contiguous data pulses is the differentiating parameter to enable the QLM data symbol rate which is independent of the Nyquist rate, to be demodulated by the demodulator.

2. A method for communications faster than the Shannon upper bound on the communications data rate over a same frequency band $W$ of an orthogonal frequency division multiplexed (OFDM) signal using layering of the communications to increase the data symbol rate and using scaling of the data symbols to compensate for intersymbol demodulation losses, said method comprising the steps of:

generating $E_b/N_o$, SNR communications signals at the $n_pT_sW$ frequency slots of the OFDM signal packet bounded by the frequency band $W$ and time interval $T_s$ by modulating a stream of data symbols placed at the frequency slots spaced at $1/n_pT_s$ intervals wherein $T_s$ is the length of each signal packet, $1/T_s$ is the orthogonal spacing of the data symbols, $n_p \geq 1$ is the increase in the data symbol rate using quadrature layered modulation (QLM) data symbols, the $T_s$ is the symbol length for each data symbol in an OFDM signal packet and is used to represent the data symbol separation $T_s$ for communications in time, the Nyquist rate $W$ is the same for communications in time and for OFDM where the data symbols are transmitted as signal packets over $W$ and $n_pW$ is the QLM data symbol rate for OFDM, using the Shannon data symbol metrics $SNR \geq (2^b-1)$, $E_b/N_o \geq (2^b-1)/b$ for the data symbols placed at the orthogonal data symbol spacing $1/T_s$ providing data symbol communications at the Nyquist rate $W$ and at the Shannon data rate $bW$, where "b" is the information bits in each data symbol, $E_b$ is the energy per bit, $N_o$ is the noise power density, SNR is the signal to noise power ratio, and the equality is the Shannon bound, using the QLM data symbol metrics $SNR \geq £n_p^2(2^b-1)$, $E_b/N_o \geq £n_p(2^b-1)/b$ for the data symbols placed at the frequency slots spaced at $1/n_pT_s$ intervals, providing OFDM data symbol communications at a data symbol rate $n_pW$ faster than the Nyquist rate $W$ and at a data rate $n_pbW$ faster than the Shannon rate $bW$ in Bits/Second, where $n_p \geq 1$, and $£ \geq 1$ is a scaling correction to the $n_p$ scaling which compensates for the loss in the detectable signal energy caused by the interference of the overlapping signals, and the equality is the QLM bound, transmitting and receiving said scaled communications signals over a QLM communications link consisting of the QLM signal packets, recovering data symbols of the scaled communications signals in a receiver using a demodulation algorithm, and combining said algorithm with error correction decoding to recover the transmitted information; whereby frequency offsets have been used as a differentiating parameter to enable the QLM parallel sets of channels of communications over the same frequency bandwidth at the same carrier frequency with a data symbol rate which is independent of the Nyquist rate, to be demodulated.

3. The method of claim 1 or 2 wherein the communication signals have the following properties:

maximum normalized data rate (C/W) which is the communications efficiency in (Bits/Second)/Hz is defined by equation $$C/W \leq \max_{np}[n_p \log_2(1 + SNR/£n_p^2)]$$

wherein the maximum "max" is with respect to $n_p$, "$\log_2$" is the logarithm to the base 2, and the communications link capacity C is in Bits/Second, the lower bound on the QLM performance metric SNR for $C/W = n_p b$ is defined by equation $$SNR \geq £n_p^2(2^b-1),$$

lower bound on the QLM performance metric $E_b/N_o$ for $C/W = n_p b$ is defined by equation $$E_b/N_o \geq £n_p(2^b-1)/b$$

wherein "b" is the number of information bits in the QLM data symbol, and these performance bounds apply to communications receiver demodulation performance of a QLM communications link.

4. The method of claim 1 or 2 for implementation of QLM communications links, further comprising:

constructing QLM channels of scaled communications $E_b/N_o$, SNR for a QLM communications link over a frequency bandwidth $W$ of a carrier frequency with a data symbol rate independent of the Nyquist rate, $E_b$ is the energy per bit, $N_o$ is the noise power density, SNR is the signal to noise power ratio, using the Shannon data symbol metrics $SNR \geq (2^b-1)$, $E_b/N_o \geq (2^b-1)/b$ for communications at the data symbol rate $\leq W$ over a frequency band $W$ where $W$ is the Nyquist rate, "b" is the information bits in each data symbol, and the equality is the Shannon bound, using the QLM data symbol metrics $SNR \geq £n_p^2(2^b-1)$, $E_b/N_o \geq £n_p(2^b-1)/b$ for communications at a data symbol rate $n_pW$ faster than the Nyquist rate $W$ and at a data rate $n_pbW$ faster than the Shannon data rate $bW$ in Bits/Second, wherein $n_p \geq 1$ is the increase in the data symbol rate beyond the Nyquist rate and the Shannon bound and is the number, $n_p$, of QLM communications layers with each layer at the Nyquist rate and the Shannon bound, using one or more differentiating parameters to enable the channel signals of the QLM link to be demodulated, and implementing said demodulation using a trellis algorithm or maximum likelihood packet algorithm or a plurality of detection algorithms combined with error correction decoding algorithms, and combining said demodulation algorithm with error correction decoding to recover the transmitted information.

5. The method of claim 1 or 2 for implementation of QLM communications links, further comprising:

communicating at a data rate $C/W = n_p b$ in (Bits/Second)/Hz over a frequency bandwidth $W$ wherein "b" is the information bits in each data symbol, $n_p W$ is the data symbol rate, $n_p b W$ in Bits/Second is the data rate, and $n_p \geq 1$ is the increase in data symbol rate $n_p W$ above the Nyquist rate $W$ and increase in data rate $n_p b W$ above the Shannon rate $bW$ in Bits/Second, using QLM data symbol metrics $SNR \geq \pounds n_p^2 (2\hat{\ }b-1)$, $E_b/N_o \geq \pounds n_p (2\hat{\ }b-1)/b$ wherein the equality is the QLM bound, using one or more scaled data symbol modulations for the QLM communications channels, using one or more differentiating parameters to enable the channel signals of the QLM link to be demodulated, and implementing said demodulation using a trellis algorithm or maximum likelihood packet algorithm or a plurality of detection algorithms combined with error correction decoding algorithms.

\* \* \* \* \*